United States Patent
Ishibashi

(10) Patent No.: US 11,333,480 B2
(45) Date of Patent: May 17, 2022

(54) MEASURING INSTRUMENT AND MEASURE

(71) Applicant: FUJITSU COMPONENT LIMITED, Tokyo (JP)

(72) Inventor: Kazunori Ishibashi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 17/113,556

(22) Filed: Dec. 7, 2020

(65) Prior Publication Data

US 2021/0180934 A1    Jun. 17, 2021

(30) Foreign Application Priority Data

Dec. 12, 2019 (JP) .............................. JP2019-224854
Nov. 13, 2020 (JP) .............................. JP2020-189632

(51) Int. Cl.
*G01B 5/02*   (2006.01)
*G01D 5/26*   (2006.01)
*G01B 5/008*  (2006.01)

(52) U.S. Cl.
CPC ................ *G01B 5/02* (2013.01); *G01B 5/008* (2013.01); *G01D 5/26* (2013.01)

(58) Field of Classification Search
CPC ......... G01B 5/02; G01D 5/26; G01D 5/34746
USPC ................................................... 33/706, 707
See application file for complete search history.

(56) References Cited

U.S. PATENT DOCUMENTS

| | | | |
|---|---|---|---|
| 5,173,602 A | 12/1992 | Lin | |
| 5,563,408 A * | 10/1996 | Matsumoto | G01D 5/2455 250/231.14 |
| 6,996,494 B2 * | 2/2006 | Braasch | G01D 18/00 702/150 |
| 7,971,487 B2 * | 7/2011 | Carlen | G01D 18/00 73/760 |
| 8,505,210 B2 * | 8/2013 | Gribble | G01D 5/34776 33/701 |
| 8,658,965 B2 * | 2/2014 | An | G01D 5/3473 250/231.13 |
| 9,651,403 B2 * | 5/2017 | Kim | G01D 5/34776 |
| 10,371,548 B2 * | 8/2019 | Angelis | G01D 5/04 |

FOREIGN PATENT DOCUMENTS

| | | |
|---|---|---|
| JP | 5272916 | 10/1993 |
| JP | 735535 | 2/1995 |
| JP | 7294238 | 11/1995 |
| JP | 10105639 | 4/1998 |
| JP | 200975013 | 4/2009 |

* cited by examiner

*Primary Examiner* — George B Bennett
(74) *Attorney, Agent, or Firm* — Staas & Halsey LLP

(57) ABSTRACT

A measuring instrument includes a plurality of first readers that optically read a plurality of patterns from a measure having a color pattern including the plurality of patterns arranged at a regular interval in a length direction, the plurality of first readers being arranged at the regular interval in the length direction, a converter that converts the plurality of patterns read by the plurality of first readers into a value of an N-ary number (N is 3 or more), and a calculator that calculates a scale value of the measure based on data that defines a relationship between the value of the N-ary number and the scale value of the measure.

9 Claims, 21 Drawing Sheets

FIG. 3

| LIGHT RECEIVING UNIT | | | CONVERSION VALUE | | SCALE VALUE OF MEASURE |
|---|---|---|---|---|---|
| 9A3 | 9A2 | 9A1 | TERNARY NUMBER | DECIMAL NUMBER | |
| 0 | 0 | 0 | 000 | 0 | 0 |
| 0 | 0 | 1 | 001 | 1 | 1 |
| 0 | 1 | 0 | 010 | 3 | 2 |
| 1 | 0 | 1 | 101 | 10 | 3 |
| 0 | 1 | 1 | 011 | 4 | 4 |
| 1 | 1 | 1 | 111 | 13 | 5 |
| 1 | 1 | 0 | 110 | 12 | 6 |
| 1 | 0 | 0 | 100 | 9 | 7 |
| 0 | 0 | 2 | 002 | 2 | 8 |
| 0 | 2 | 0 | 020 | 6 | 9 |
| 2 | 0 | 1 | 201 | 19 | 10 |
| 0 | 1 | 2 | 012 | 5 | 11 |
| 1 | 2 | 0 | 120 | 15 | 12 |
| 2 | 0 | 2 | 202 | 20 | 13 |
| 0 | 2 | 1 | 021 | 7 | 14 |
| 2 | 1 | 0 | 210 | 21 | 15 |
| 1 | 0 | 2 | 102 | 11 | 16 |
| 0 | 2 | 2 | 022 | 8 | 17 |
| 2 | 2 | 1 | 221 | 25 | 18 |
| 2 | 1 | 2 | 212 | 23 | 19 |
| 1 | 2 | 1 | 121 | 16 | 20 |
| 2 | 1 | 1 | 211 | 22 | 21 |
| 1 | 1 | 2 | 112 | 14 | 22 |
| 1 | 2 | 2 | 122 | 17 | 23 |
| 2 | 2 | 2 | 222 | 26 | 24 |
| 2 | 2 | 0 | 220 | 24 | 25 |
| 2 | 0 | 0 | 200 | 18 | 26 |

FIG. 6

| COLOR NUMBER | DETECTED VALUE (VOLTAGE) |
|---|---|
| 1 | 2.0V±5% |
| 2 | 1.5V±5% |
| 3 | 1.0V±5% |

FIG. 8

| COLOR NUMBER (FIRST COLOR) | COLOR NUMBER (SECOND COLOR) | BOUNDARY DETECTED VALUE (VOLTAGE VLUE) | CORRESPONDING COLOR NUMBER |
|---|---|---|---|
| 1 | 2 | 1.75 | NONE |
|   | 3 | 1.50 | 2 |
| 2 | 1 | 1.75 | NONE |
|   | 3 | 1.25 | NONE |
| 3 | 1 | 1.50 | 2 |
|   | 2 | 1.25 | NONE |

FIG. 10

| LIGHT RECEIVING UNIT 9B1 | LIGHT RECEIVING UNIT 9A1 | LIGHT RECEIVING UNIT 9C1 | LIGHT RECEIVING UNIT TO BE USED FOR SCALE CONVERSION |
|---|---|---|---|
| COLOR NUMBER 2 | COLOR NUMBER 2 | COLOR NUMBER 1 | 9A1-9A3 |
| COLOR NUMBER 1 | COLOR NUMBER 2 | COLOR NUMBER 2 | |
| COLOR NUMBER 2 | COLOR NUMBER 2 | COLOR NUMBER 3 | |
| COLOR NUMBER 3 | COLOR NUMBER 2 | COLOR NUMBER 2 | |
| COLOR NUMBER 2 | COLOR NUMBER 2 | COLOR NUMBER 2 | |
| COLOR NUMBER 1 | COLOR NUMBER 2 (BOUNDARY) | COLOR NUMBER 3 | 9B1-9B3 |
| COLOR NUMBER 3 | COLOR NUMBER 2 (BOUNDARY) | COLOR NUMBER 1 | |

FIG. 19

| MOVING DIRECTION ↓ | MEASURE | | | | DETECTED VALUE OF LIGHT RECEIVING UNIT | | | | PATTERN No. | CONVERTED VALUE | |
|---|---|---|---|---|---|---|---|---|---|---|---|
| | 9A1 | 9A2 | 9A3 | 9A4 | | | | | | TERNARY NUMBER | DECIMAL NUMBER |
| | | | | | 9A1 | 9A2 | 9A3 | 9A4 | | | |
| | 0 | 0 | 0 | 0 | 0 | 0 | 0 | 0 | 0 | 0000 | 0 |
| | 1 | 0 | 0 | 0 | 0 | 0 | 0 | 1 | 1 | 0001 | 1 |
| | 0 | 0 | 0 | 0 | 0 | 0 | 1 | 0 | 2 | 0010 | 3 |
| | 0 | 0 | 0 | 0 | 0 | 1 | 0 | 0 | 3 | 0100 | 9 |
| | 1 | 1 | 0 | 0 | 1 | 0 | 0 | 1 | 4 | 1001 | 28 |
| | 1 | 0 | 0 | 0 | 0 | 0 | 1 | 1 | 5 | 0011 | 4 |
| | 0 | 0 | 0 | 0 | 0 | 1 | 1 | 0 | 6 | 0110 | 12 |
| | 1 | 1 | 1 | 0 | 1 | 1 | 0 | 1 | 7 | 1101 | 37 |
| | 0 | 1 | 0 | 0 | 1 | 0 | 1 | 0 | 8 | 1010 | 30 |
| | 1 | 0 | 1 | 0 | 0 | 1 | 0 | 1 | 9 | 0101 | 10 |
| | 1 | 1 | 0 | 0 | 1 | 0 | 1 | 1 | 10 | 1011 | 31 |
| | 1 | 0 | 1 | 1 | 0 | 1 | 1 | 1 | 11 | 0111 | 13 |
| | 1 | 1 | 1 | 1 | 1 | 1 | 1 | 1 | 12 | 1111 | 40 |
| | 0 | 1 | 1 | 1 | 1 | 1 | 1 | 0 | 13 | 1110 | 39 |
| | 0 | 1 | 1 | 0 | 1 | 1 | 0 | 0 | 14 | 1100 | 36 |
| | 0 | 1 | 0 | 0 | 1 | 0 | 0 | 0 | 15 | 1000 | 27 |
| | 2 | 0 | 0 | 0 | 0 | 0 | 0 | 2 | 16 | 0002 | 2 |
| | 0 | 0 | 0 | 0 | 0 | 0 | 2 | 0 | 17 | 0020 | 6 |
| | 0 | 0 | 0 | 0 | 0 | 2 | 0 | 0 | 18 | 0200 | 18 |
| | 2 | 2 | 0 | 0 | 2 | 0 | 0 | 2 | 19 | 2002 | 56 |
| | 2 | 0 | 0 | 0 | 0 | 0 | 2 | 2 | 20 | 0022 | 8 |
| | 0 | 0 | 0 | 0 | 0 | 2 | 2 | 0 | 21 | 0220 | 24 |
| | 2 | 2 | 2 | 0 | 2 | 2 | 0 | 2 | 22 | 2202 | 74 |
| | 0 | 2 | 0 | 0 | 2 | 0 | 2 | 0 | 23 | 2020 | 60 |
| | 2 | 0 | 2 | 0 | 0 | 2 | 0 | 2 | 24 | 0202 | 20 |
| | 2 | 2 | 0 | 0 | 2 | 0 | 2 | 2 | 25 | 2022 | 62 |
| | 2 | 0 | 2 | 2 | 0 | 2 | 2 | 2 | 26 | 0222 | 26 |
| | 2 | 2 | 2 | 2 | 2 | 2 | 2 | 2 | 27 | 2222 | 80 |
| | 0 | 2 | 2 | 2 | 2 | 2 | 2 | 0 | 28 | 2220 | 78 |
| | ⋮ | ⋮ | ⋮ | ⋮ | ⋮ | ⋮ | ⋮ | ⋮ | ⋮ | ⋮ | ⋮ |

MEASURING INSTRUMENT AND MEASURE

CROSS-REFERENCE TO RELATED APPLICATION

This application is based upon and claims the benefit of priority of the prior Japanese Patent Applications No. 2019-224854 filed on Dec. 12, 2019 and No. 2020-189632 filed on Nov. 13, 2020, the entire contents of which are incorporated herein by reference.

FIELD

A certain aspect of the embodiments is related to a measuring instrument and a measure.

BACKGROUND

There is known a measurement system that can directly input length data obtained by measuring a length of an object to an external terminal (e.g. Japanese Laid-open Patent Publication No. 7-35535). In the measurement system, a two-color dot pattern printed on a measure is read, and the read pattern is converted into the length data and transmitted.

There is known a handy terminal with a dimensional measurement function (e.g. Japanese Laid-open Patent Publication No. 10-105639). Furthermore, there are known techniques for optically reading a pattern printed on a measure (e.g. Japanese Laid-open Patent Publications No. 2009-75013, No. 5-272916 and No. 7-294238).

SUMMARY

According to an aspect of the present invention, there is provided a measuring instrument including: a plurality of first readers that optically read a plurality of patterns from a measure having a color pattern including the plurality of patterns arranged at a regular interval in a length direction, the plurality of first readers being arranged at the regular interval in the length direction; a converter that converts the plurality of patterns read by the plurality of first readers into a value of an N-ary number (N is 3 or more); and a calculator that calculates a scale value of the measure based on data that defines a relationship between the value of the N-ary number and the scale value of the measure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a table in which a single scale value of the measure is assigned to three patterns.

FIG. 6 is a diagram illustrating a correspondence relationship between a color number detected by each light receiving unit and a detected voltage value;

FIG. 8 is a diagram illustrating a relationship between color numbers, a voltage value, and a corresponding color number of the two patterns when the light receiving units read a boundary between the two patterns;

FIG. 10 is a diagram illustrating a relationship between color numbers detected by three light receiving units and light receiving units to be used for scale conversion;

FIG. 19 is a diagram illustrating a correspondence relationship between the measure of FIG. 17A, values read by the four light receiving units, a pattern No., and converted values of a ternary number and a decimal number;

DESCRIPTION OF EMBODIMENTS

In a measure in which a plurality of line patterns each having a plurality of patterns in a width direction are printed, a single line pattern corresponds to a single measured value.

Therefore, when a length that can be measured by the measure is increased, the number of patterns constituting the single line pattern must be increased, and the width of the measure needs to be increased.

In the case of a curved measure such as a convex type steel measure, if the plurality of patterns are printed in the width direction of the measure, a distance between a sensor and each pattern changes depending on a position in the width direction, so that an error may occur in a reading result of each sensor. For example, in the case of a measure that is curved toward the sensor at a central portion, a sensor arranged opposite to a pattern located at the center of the measure is close to the measure, but sensors located at the ends of the measure in the width direction are away from the measure. For this reason, even if the pattern of the same color is read, the color of the pattern may not be accurately detected due to the influence of fluctuations in the amount of light received by the center sensor and the end sensors. This problem can occur not only in the steel measure but also in a resin measure when a detector is tilted or the measure is twisted.

Hereinafter, a description will be given of the present embodiment of the present invention with reference to the drawings.

First Embodiment

Figure 1:
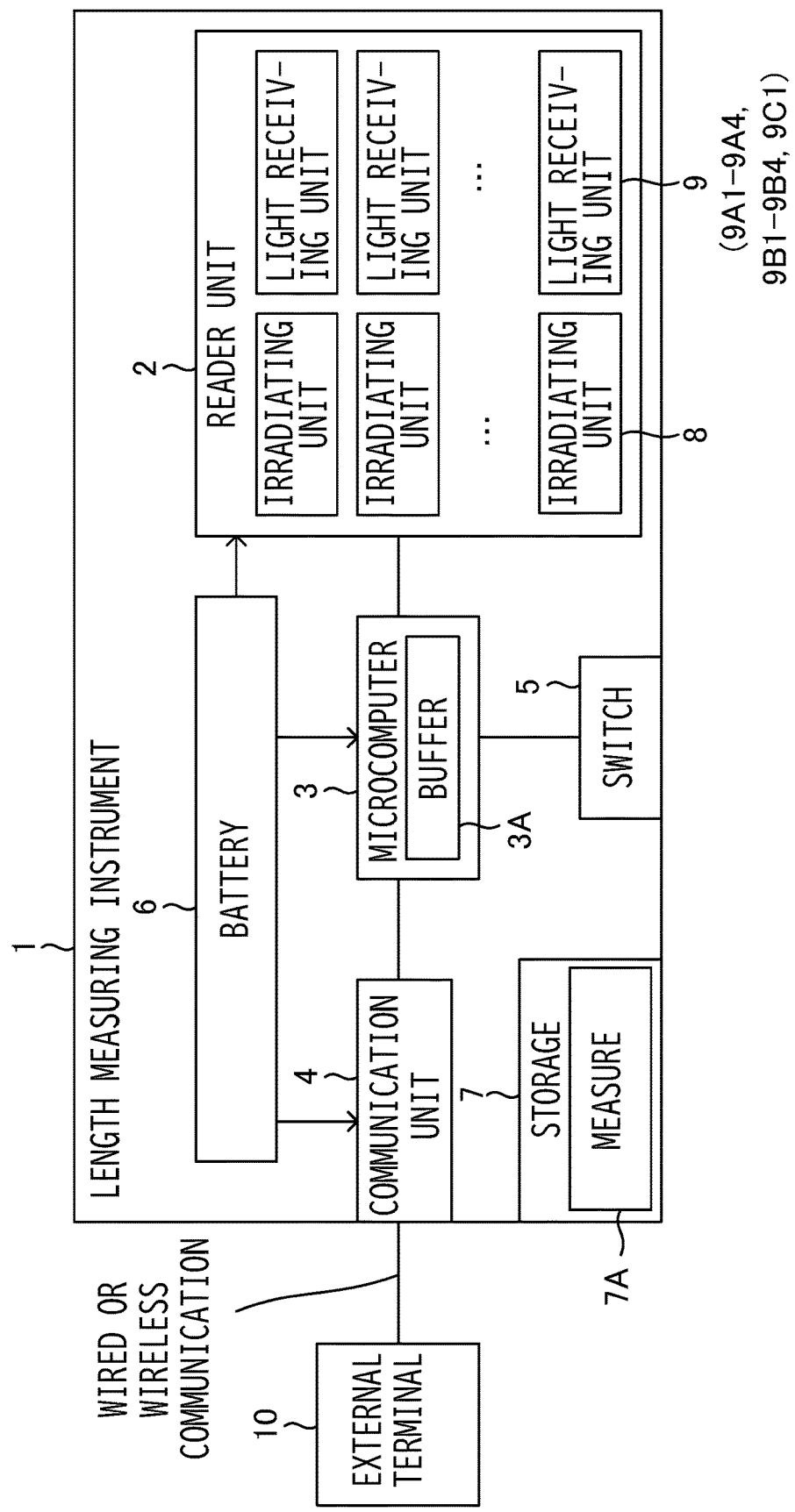
FIG. 1 is a configuration diagram of a length measuring instrument according to a first embodiment.

FIG. 1 is a configuration diagram of a length measuring instrument according to a first embodiment. In one example, the length measuring instrument may be used in a clothing store, but may be used for any other purposes.

A length measuring instrument (hereinafter referred to as "a measuring instrument") 1 includes: a reader unit 2 that reads a color pattern from a measure 7A; a microcomputer 3 that calculates a length of a measurement object from data read by the reader unit 2; a communication unit 4 that transmits data on the calculated length of the measurement object to an external terminal 10 by wired or wireless communication; a switch 5 that instructs the start of the measurement to the microcomputer 3; a battery 6 that supplies an electric power to the reader unit 2, the microcomputer 3 and the communication unit 4; and a storage 7 that stores the measure 7A. The microcomputer 3 includes a buffer 3A storing data, flags, and the like.

The measuring instrument 1 and the external terminal 10, or the measuring instrument 1 alone, may configure a measuring system for measuring and determining a length of a measurement object. When the measuring instrument 1 and the external terminal 10 are combined, a process of calculating the length of the measurement object may be performed by the external terminal 10 as a substitute for the microcomputer 3 of FIG. 1. At this time, the measuring instrument 1 transmits a reading value read by the reader unit 2 to the external terminal 10. When the external terminal 10 is not used, the measuring instrument 1 may execute the functions of the external terminal 10 described in first to third embodiments. The measuring system may further include other devices such as a server, a storage device, or any type of communication devices.

The measuring system may have functions for storing measured lengths, or processing the measured lengths for purposes such as measurement for making clothes for example. These functions are realized by executing software in the external terminal 10 or other devices.

The reader unit 2 includes: irradiating units 8 each of which irradiates the color pattern with a light; and light receiving units 9 each of which receives reflected light from the color pattern, and outputs a current or voltage with a value corresponding to a receiving light amount. The irradiating unit 8 is a light emitting diode (LED) 8, and the light receiving unit 9 is a phototransistor, for example. The irradiating unit 8 is irradiated with light such as infrared light, visible light and ultraviolet light. The light receiving unit 9 receives the light reflected by the color pattern. Unless otherwise explained, the single irradiating unit 8 and the single light receiving unit 9 are used in a single set, but the single irradiating unit 8 and a plurality of light receiving units 9 may be used in the single set, as described below. When it is necessary to distinguish the plurality of light receiving units from each other, the light receiving units are designated by reference numbers such as 9A1 to 9A4, 9B1 to 9B4 or 9C1. Hereinafter, the set of the irradiating unit 8 and the light receiving unit 9 may be collectively referred to as the "light receiving unit 9". The reader unit 2 should have at least a function corresponding to the light receiving unit 9.

The microcomputer 3 includes a processor such as a central processing unit (CPU), and a nonvolatile memory, and functions as a converter, a calculator, and a determiner. The microcomputer 3 controls on/off of the irradiating unit 8, and reads the current value or voltage value of the output from the light receiving unit 9. Since the reflectivities of the light are different by colors, and the light receiving amount of the light receiving unit 9 varies depending on the reflectivities, the microcomputer 3 is capable of determining the color of each pattern by the current value or voltage value output from the light receiving unit 9. Then, the microcomputer 3 converts a color detected by each light receiving unit 9 into a value of a ternary number or decimal number, and calculate a scale value of the measure 7A corresponding to the converted value of the ternary number or decimal number using a table described later. Thereby, the length of the measurement object is calculated.

Scales are printed on a front surface of the measure 7A along a longitudinal direction, and color patterns using N (N>=3) colors are printed on a back surface of the measure 7A. The details of the color pattern are described later. The storage 7 is removably attached to a housing of the measuring instrument 1. In FIG. 1, the measure 7A is housed in the storage 7. However, the measure 7A does not need to be stored in the storage 7 or in the measuring instrument 1 as long as the measuring instrument 1 can read color patterns on the measure 7A. For instance, the measuring instrument 1 may have a slit for slidably passing the measure 7A without accommodating the measure 7A.

The external terminal 10 is a communication terminal such as a computer or smart phone having a wired or wireless communication function, receives the data of the length of the measurement object from the communication unit 4, and registers and manages the data in the database. The database for registering the data of the length may be incorporated in the external terminal 10, or may be provided outside of the external terminal 10 in an accessible state. Further, software for processing the measured length may be stored in the external terminal 10 or in any other device in which the external terminal 10 is accessible.

Figure 2:
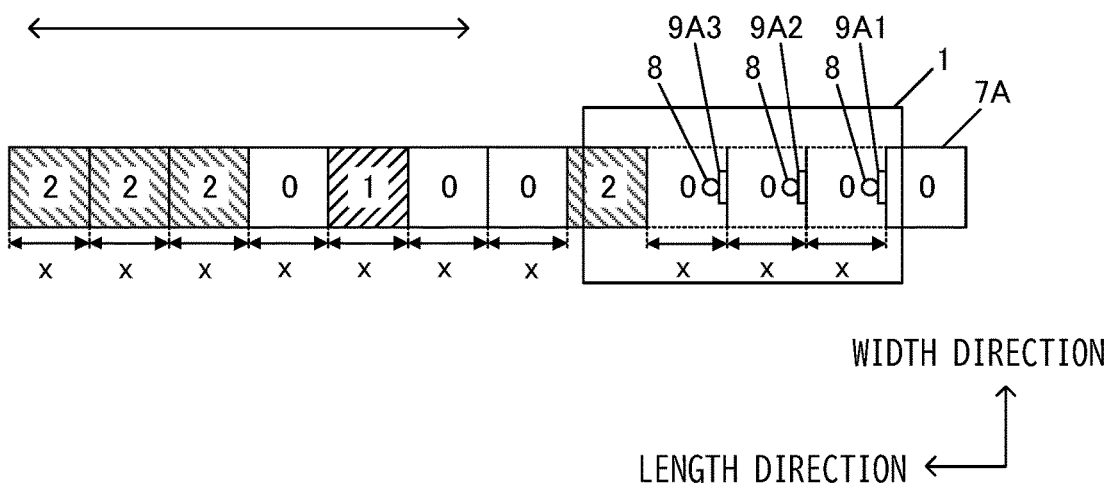
FIG. 2 is a diagram illustrating an example in which the measuring instrument having three sets of light receiving units reads a measure.

FIG. 2 is a diagram illustrating an example of a color pattern printed on the back surface of the measure 7A according to the present embodiment. The present embodiment represents an example of reading the color pattern of the measure 7A by using the measuring instrument 1 having three sets of the irradiating unit 8 and the light receiving unit 9. A vertical direction of FIG. 2 is a width direction of the measure 7A. A horizontal direction of FIG. 2 is a length direction of the measure 7A, and a moving direction of the measure 7A with respect to the measuring instrument 1.

A color pattern including a plurality of patterns arranged in a row in the length direction at regular intervals X is printed on the measure 7A of FIG. 2. Each pattern has any one of three different colors, and any value of 0, 1 or 2 is assigned to each color. In the example of FIG. 2, each pattern has any one of white, blue, and black, and values of "0", "1", and "2" are assigned to white, blue, and black, respectively. In the pattern of FIG. 2, the values of "0" to "2" corresponding to the colors are illustrated, but this is for easy understanding, and it is not necessary to print these values on the measure 7A. Similarly, the boundaries between the patterns are also illustrated for ease of understanding, but it is not necessary to draw such boundaries on the measure 7A.

In the example of FIG. 2, three patterns adjacent to each other in the length direction constitute a single unit pattern, and a single ternary value is assigned to the single unit pattern.

Since it is sufficient that the three values corresponding to "0" to "2" can be output by reading by the reader unit 2, it is not necessary to print each pattern in different colors or different hues. If respective patterns can be optically distinguished, the color patterns with different shade and reflectivity of the individual pattern may be used. For example, patterns with different brightness and saturation in the same hue may be printed, such as "light red", "slightly darker red", "even darker red" and so on. Further, as long as the reader unit 2 can distinguish the colors, the difference in color need not to be visually distinguishable. In the present embodiment, such differences in brightness and saturation, and other modes for realizing different reflectivity are also treated as "different colors", The reflectivities of the patterns may be different by changing the shapes of the respective patterns. If the "reflectivities" of the patterns are focused on, these can also be regarded as the "different colors" for convenience.

An interval X, which is also a length of the pattern, corresponds to a unit length measurable by the measure 7A. In the measuring instrument 1, three light receiving units 9A1 to 9A3 and three irradiating units 8 for detecting the reflected light from the color patterns of the measure 7A are arranged at the intervals X in the same manner as the patterns. Each light receiving unit 9A reads any one of the patterns constituting the single unit pattern. The number of sets of the irradiating unit 8 and the light receiving unit 9 may be two or four or more depending on the number of patterns constituting the single unit pattern and the like. As will be described later, the number of irradiating units 8 does not have to be the same as the number of patterns constituting the single unit pattern.

The light receiving unit 9 outputs a voltage having a value corresponding to the reflected light from the pattern. The microcomputer 3 determines the color of each pattern based on the voltage value output from the light receiving unit 9. In the present embodiment, when the output voltage of the light receiving unit 9 is 2.0V, 1.5V or 1.0V, the microcomputer 3 determines that the pattern color is white, blue or black, respectively. The microcomputer 3 replaces the read color with one of the corresponding ternary values "0" to "2", if necessary.

Since the moving direction of the measure 7A is the same as an arrangement direction of the patterns, each time the measure 7A moves by the length of one pattern, the patterns read by the light receiving units 9A1 to 9A3 also shift one by one in the length direction. The three light receiving units 9A1 to 9A3 function as a plurality of first readers.

The buffer 3A includes a table in which the scale values of the measure 7A are assigned to the unit pattern read by the light receiving units 9A1 to 9A3. An example of the table is illustrated in FIG. 3, and the color pattern corresponding to the table is illustrated in FIG. 4.

The measuring instrument 1 reads the single unit pattern including the three patterns adjacent to each other in the length direction. In FIG. 3, the colors of the three patterns read by the measuring instrument 1, the ternary number corresponding to each unit pattern, the decimal number converted from the ternary number, and the scale value corresponding to the unit pattern are associated with each other.

Figure 4:
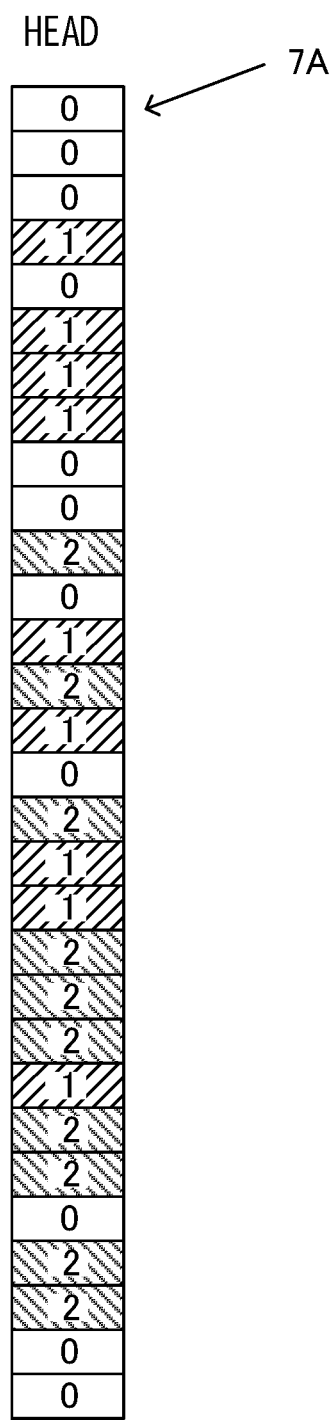
FIG. 4 is a diagram illustrating an example of color patterns on the measure.

An L-th unit pattern (L>=1) in FIG. 3 corresponds to a combination of the L-th to L+2-th three patterns from the beginning among the color patterns in FIG. 4. For example, a third unit pattern in FIG. 3 corresponds to a combination of third to fifth three patterns in FIG. 4.

In the measure 7A, the colors of the patterns are arranged so that the configuration of the unit patterns from the beginning to the end do not overlap with each other.

Each color pattern of the present embodiment is represented by the ternary number, but in the table illustrated in FIG. 3, the ternary numbers corresponding to the unit patterns are not arranged in an ascending or descending order. Further, decimal values converted from ternary values are also not arranged in the ascending or descending order of the decimal number. On the other hand, the scale values arranged in the table in the ascending order do not mathematically correspond to the ternary values or the decimal values in the table. For example, a ternary value "101" in a fourth row of FIG. 3 mathematically means a decimal number "10", but is assigned to a scale value "3". For this reason, in this embodiment, the table is used to determine the correspondence between the scale value in the ascending order, and the ternary value and the decimal value that are not arranged in the ascending or descending order.

The microcomputer 3 determines the scale value corresponding to the three patterns read by the light receiving units 9A1 to 9A3 based on the table in FIG. 3, and the communication unit 4 transmits the scale value to the external terminal 10.

Figure 5:
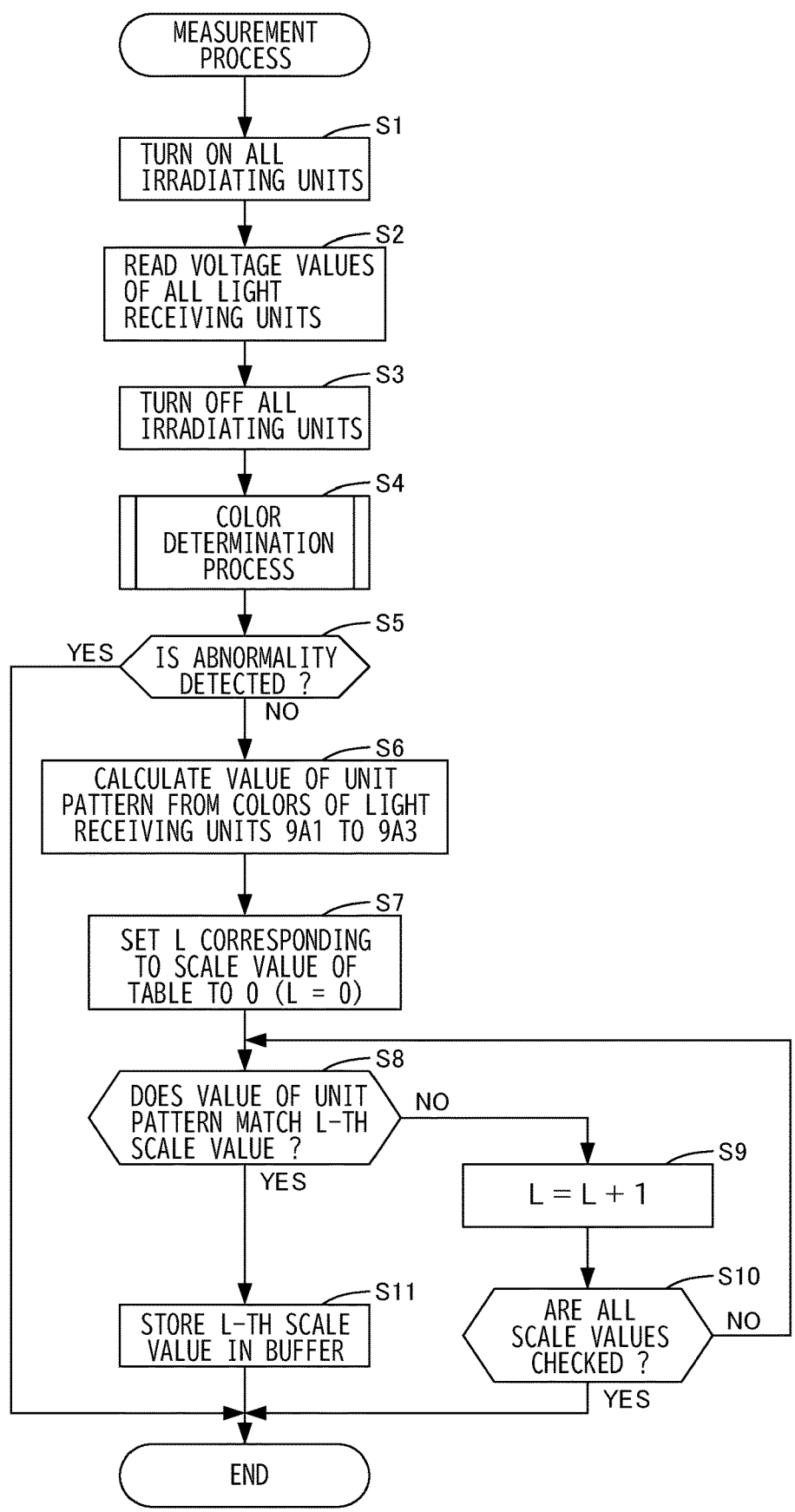
FIG. 5 is a flowchart illustrating a measurement process to be executed by the measuring instrument.

FIG. 5 is a flowchart illustrating a measurement process to be executed by the measuring instrument 1.

The irradiating unit 8 is turned off before the start of the length measurement process of the length. When a user operates the switch 5 in measuring the length of the measurement object using the measure 7A, the measuring instrument 1 executes the measurement process illustrated in FIG. 5.

When the switch 5 is operated to measure the length, the microcomputer 3 turns on all the irradiating units 8 (S1). As a result, since the light receiving units 9A1 to 9A3 receive the reflected light from each pattern, the microcomputer 3 reads out output voltage values of the light receiving units 9A1 to 9A3 (S2), and then turns off the irradiating units 8 (S3), Next, the microcomputer 3 performs a color determination process for each pattern from the output voltage of the light receiving unit 9 (S4). The details of the color determination process are described later.

Next, the microcomputer 3 determines whether an abnormality is detected in the color determination process (S5). For example, when the output voltage value of any of the light receiving units 9 does not correspond to a predetermined voltage range to be detected, the microcomputer 3 determines that the abnormality is detected. When the abnormality is detected in the color determination process (YES in S5), this process ends. When the abnormality is not detected in the color determination process (NO in S5), the microcomputer 3 calculates the ternary value and/or the decimal value corresponding to the unit pattern from the colors of the patterns read by the light receiving units 9A1 to 9A3 (S6).

The microcomputer 3 initializes the value of L corresponding to the scale value in the table of FIG. 3 by setting it to 0 (L=0), in order to compare the L-value with the value calculated in S6 (S7). Next, the microcomputer 3 determines whether the value calculated in S6 matches the L-th scale value in the table of FIG. 3 (S8), When the value calculated in S6 matches the L-th scale value (YES in S8), the microcomputer 3 stores the scale value in the buffer 3A (S11), and this process ends. The scale value stored in the buffer 3A is transmitted to the external terminal 10 using the communication unit 4. On the other hand, when the value calculated in S6 does not match the L-th scale value (NO in S8), the microcomputer 3 increments the L value by 1 (L=L+1) (S9). Then, the microcomputer 3 determines whether all the scale values (L=0 to 26) are checked (S10). When all the scale values are not checked (NO in S10), the process returns to S8. When all the scale value are checked (YES in S10), this process ends. When the answer to the determination in S10 is YES, the unit pattern corresponding to the read unit pattern is not set in the table of FIG. 3, and hence the process is treated as an error.

FIG. 6 is a diagram illustrating a correspondence relationship between the color number of the pattern and the output voltage value which is a detected value of each light receiving unit. When the output voltage value of the light receiving unit 9 is 2.0V±5%, the color number becomes 1. When the detected value of the light receiving unit 9 is 1.5±5%, the color number becomes 2. When the detected value of the light receiving unit 9 is 1.0V+5%, the color number becomes 3. The microcomputer 3 performs the process of S4 by utilizing such a correspondence relationship.

Figure 7:
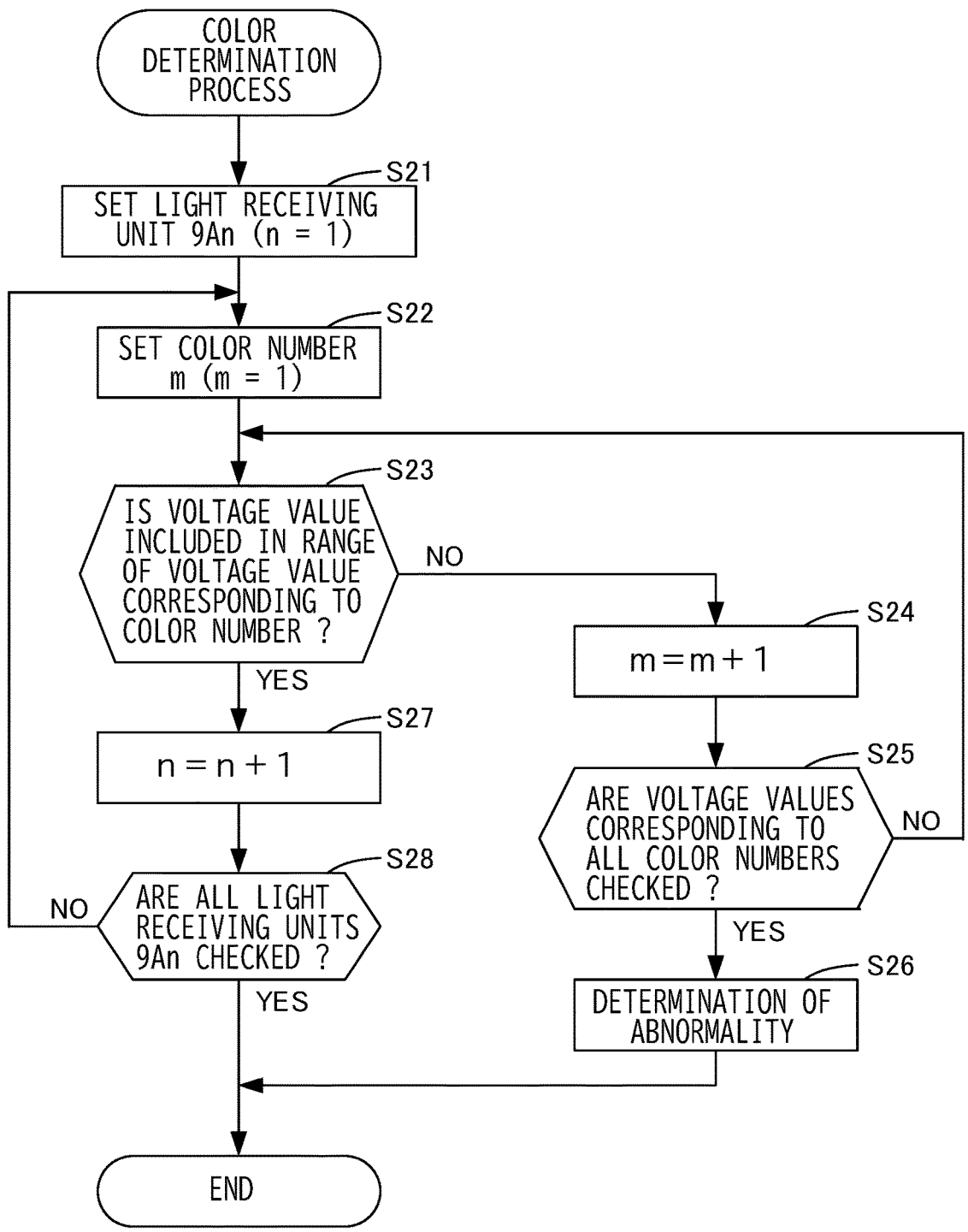
FIG. 7 is a flowchart illustrating a color determination process in S4.

FIG. 7 is a flowchart illustrating the color determination process in S4.

The microcomputer 3 sets a light receiving unit 9An, which is an object of the color determination process, to 9A1 as an initial value (n=1) (S21). Next, the microcomputer 3 sets 1 as an initial value of a color number m which is a determination object (m=1) (S22). Then, the microcomputer 3 determines whether the voltage value detected by the light receiving unit 9An is included in a range of the voltage value of FIG. 6 corresponding to the color number m (S23).

When the voltage value of the light receiving unit 9An is not included in the range of the voltage value corresponding to the color number m (NO in S23), the microcomputer 3 increments a value of the color number m by 1 (m=m+1) (S24). The microcomputer 3 determines whether the voltage values corresponding to all the color numbers are checked (S25).

When the voltage values corresponding to all the color numbers are not checked (NO in S25), the process returns to S23. When the voltage values corresponding to all the color numbers are checked (YES in S25), the microcomputer 3 determines that the detection result is abnormal (S26), and this process ends.

When the voltage value of the light receiving unit 9An is included in the range of the voltage value corresponding to the color number m (YES in S23), the microcomputer 3 increments a value of the light receiving unit 9An by 1 (n=n+1) (S27).

The microcomputer 3 determines whether all the light receiving units 9An are checked (S28). When all the light receiving units 9An are not checked (NO in S28), the process returns to S22, and a process related to the light receiving unit 9An 1 is performed. When all the light receiving units 9An are checked (YES in S28), this process ends.

As described above, according to the first embodiment, the light receiving units 9 are arranged in a row in the length direction of the measure 7A at regular intervals, and optically read the patterns arranged at regular intervals in the length direction of the measure 7A. Since it is sufficient that a single row of color pattern is printed on the measure 7A, the width of the measure can be made smaller, and the first embodiment can be also applied to a curved measure such as the convex type measure.

Second Embodiment

FIG. 8 is a diagram illustrating a relationship between the color numbers of the two adjacent patterns, the voltage value output by the light receiving unit 9 and the color number corresponding to the voltage value, when the light receiving unit 9 reads a boundary between the two patterns. A "color number (first color)" refers to a pattern located on one side of the measure 7A in the length direction with respect to the light receiving unit 9, and the "color number (second color)" refers to a pattern located on the other side in the length direction. Here, the detected values when the light receiving unit 9 reads the patterns of color numbers 1, 2, and 3, are about 2.0V, about 1.5V, and about 1.0V, respectively, as illustrated in FIG. 6.

When the light receiving unit 9 reads the boundary between the pattern of color number 1 and the pattern of color number 2, the voltage value becomes about 1.75V which corresponds to an intermediate value of 2.0V and 1.5V, as illustrated in a first or third stage of FIG. 8. However, since there is no color corresponding to the voltage of 1.75V, the microcomputer 3 can determine that the detection result is abnormal. Similarly, when the light receiving unit 9 reads the boundary between the pattern of color number 2 and the pattern of color number 3, the voltage value becomes about 1.25V which corresponds to an intermediate value of 1.5V and 1,0V, as illustrated in a fourth or sixth stage of FIG. 8. However, since there is no color corresponding to the voltage of 1.25V, the microcomputer 3 can determine that the detection result is abnormal.

When the light receiving unit 9 reads the boundary between the pattern of the color number 1 and the pattern of the color number 3, the output voltage value of the light receiving unit 9 becomes about 1.5V, as illustrated in a second or fifth stage of FIG. 8. Since the voltage value of 1.5V corresponds to the color of the color number 2, even though the boundary between the pattern of the color number 1 and the pattern of the color number 3 is read, the microcomputer 3 determines that the detection result is normal as if the light receiving unit 9 reads the pattern of color number 2. That is, the microcomputer 3 cannot determine whether the light receiving unit 9 reads the pattern of the color number 2 or the boundary between the patterns of the color number 1 and the color number 3, based on only the voltage value from the light receiving unit 9A.

In order to determine whether the boundary between the two patterns is read, the measuring instrument 1A according to the second embodiment includes four sets of light receiving units 9 (9B1 to 9B3, 9C1) in addition to three sets of light receiving units 9 (9A1 to 9A3).

Figure 9:
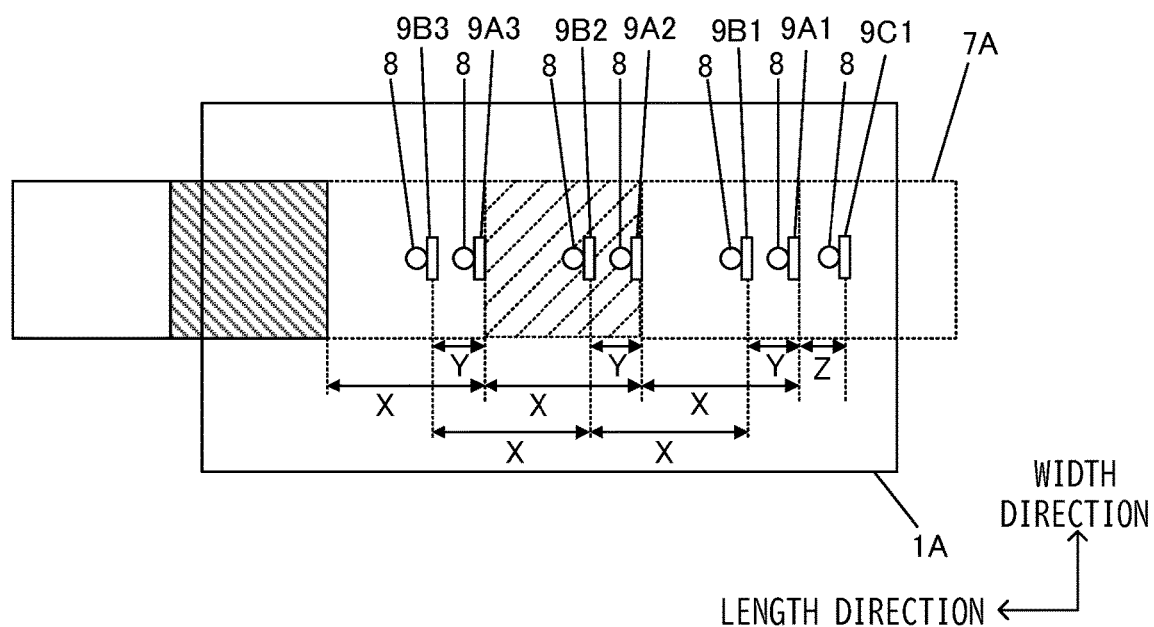
FIG. 9 is a diagram illustrating an example in which a measuring instrument according to a second embodiment reads the measure.

FIG. 9 illustrates an example in which a measuring instrument 1A according to the second embodiment reads the measure 7A. The light receiving units 9B1 to 9B3 function as a second reader, and the light receiving units 9C1 function as third reader.

Although omitted in FIG. 9, the measuring instrument 1A includes the microcomputer 3, the buffer 3A, the communication unit 4, the switch 5, the battery 6, the storage 7, and the measure 7A, as with the measuring instrument 1 according to the first embodiment. The measuring instrument 1A is different from the measuring instrument 1 in the number of the irradiating units 8 and the light receiving units 9, but the other configurations are the same.

The light receiving units 9A1 to 9A3 of FIG. 9 are arranged at the intervals X in the same manner as the light receiving units 9A1 to 9A3 of FIG. 3. The light receiving units 9B1 to 9B3 of FIG. 9 are arranged at the intervals X, and arranged away by intervals Y toward a left side of FIG. 9 in the length direction from the light receiving units 9A1 to 9A3. The light receiving unit 9C1 is arranged away by an interval Z toward a right side of FIG. 9 in the length direction from the light receiving unit 9A1. The intervals Y and Z are shorter than the interval X, One of the intervals Y and Z may be large, or the intervals Y and Z may be the same. Although the light receiving unit 9C1 in FIG. 9 is arranged corresponding to the light receiving unit 9A1, the light receiving unit 9C1 may be arranged on an opposite side of the light receiving unit 9B2 with respect to the light receiving unit 9A2, or an opposite side of the light receiving unit 9B3 with respect to the light receiving unit 9A3.

The light receiving units 9A1 to 9A3 are the light receiving units used for normal length measurement. When each of the light receiving units 941 to 9A3 reads the boundary between the two patterns, the light receiving units 9B1 to 9B3 are used for length measurement instead of the light receiving units 9A1 to 9A3. Since the light receiving units 9A1 to 9A3 are arranged at the intervals X equal to the length of the single pattern, when the light receiving unit 9A1 reads the boundary between the two patterns, the light receiving units 9A2 and 9A3 also read the boundaries between two other patterns. For this reason, in order to determine whether the light receiving units 9B1 to 9B3 should be used for length measurement, it is sufficient to determine whether any one of the light receiving units 9A1 to 9A3, e.g., the light receiving unit 9A1 reads the boundary. The microcomputer 3 can determine whether the light receiving unit 9A1 reads the boundary based on the colors of the patterns read by the light receiving units 9A1, 9B1 and 9C1.

Since a set of the light receiving units 9A and a set of the light receiving units 9B are shifted by the distance Y from each other, when the light receiving units 9B1 to 9B3 are used for length measurement, the microcomputer 3 may measure the length by subtracting the interval Y from the scale value of the measure 7A calculated from the reading results of the light receiving units 9B1 to 9B3.

FIG. 10 is a diagram illustrating a relationship between the color numbers detected by the light receiving units 9A1, 9B1 and 9C1 and the light receiving units to be used for scale conversion (i.e., length measurement).

The light receiving units 9B1 and 9C1 are arranged at respective positions away from the light receiving unit 9A1 by the intervals Y and Z shorter than the interval X so that at least one of the light receiving units 9B1 and 9C1 reads the same pattern as the light receiving unit 9A1 when the light receiving unit 9A1 reads only the single pattern. In this case, when the color of the pattern read by the light receiving unit 9A1 is the same as the color of the pattern read by at least one of the light receiving units 9B1 and 9C1 as illustrated in first to fifth lines of FIG. 10, the microcomputer 3 determines that the light receiving unit 9A1 does not read the boundary between the two patterns. When it is determined that the light receiving unit 9A1 reads the single pattern, the light receiving units to be used for length measurement are the light receiving units 9A1 to 9A3.

When the light receiving unit 9A1 reads the boundary between the pattern of the color number 1 and the pattern of the color number 3, the light receiving units 9B1 and 9C1 output detected values corresponding to the color number 1 and the color number 3, respectively, and the light receiving unit 9A1 outputs a detected value corresponding to color number 2 which corresponds to the intermediate between the color number 1 and the color number 3, as illustrated in sixth to seventh lines of FIG. 10. Therefore, the colors of the patterns detected by the light receiving units 9A1, 9B1 and 9C1 are different from each other. Thus, when the color detected by the light receiving unit 9A1 is different from the colors detected by the light receiving units 9B1 and 9C1, the microcomputer 3 determines that the light receiving unit 9B1 reads the boundary between the two patterns. In this case, the light receiving units to be used for length measurement are light receiving units 9B1 to 9B3.

In the above, the light receiving units 9B are used for two purposes, i.e., to determine whether the light receiving unit 9A reads the boundary between the two patterns, and to measure the length in place of the light receiving unit 9A when the light receiving unit 9A reads the boundary. In case of the latter purpose, the same number of light receiving units 9B1-9B3 as the light receiving units 9A1-9A3 are required. In case of the former purpose, it is sufficient that any one of the light receiving units 9B1 to 9B3 is provided.

Figure 11:
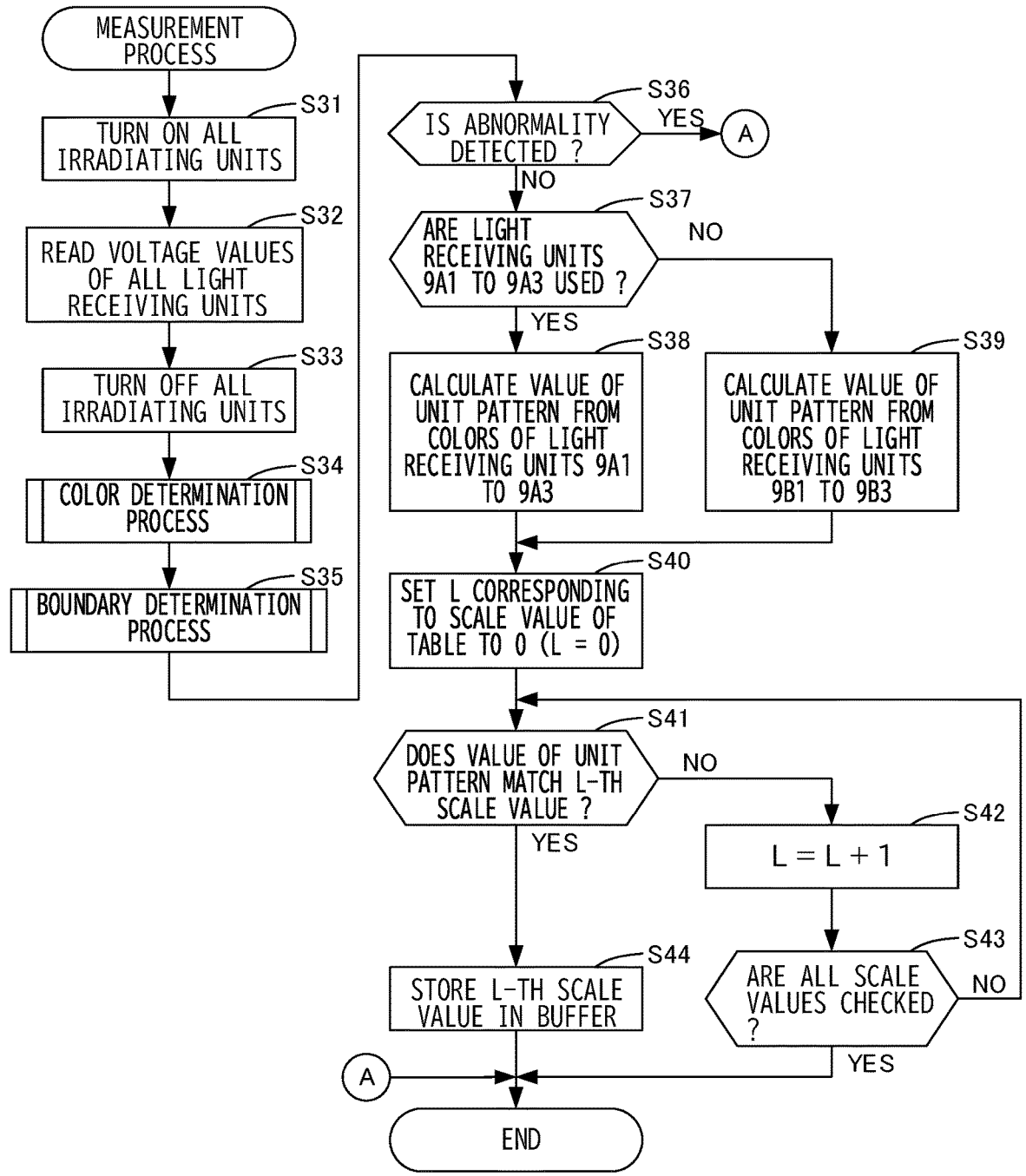
FIG. 11 is a flowchart illustrating a measurement process to be executed by the measuring instrument according to the second embodiment.

FIG. 11 is a flowchart illustrating a measurement process to be executed by the measuring instrument 1A according to the second embodiment.

When the switch 5 is operated, the microcomputer 3 turns on all the irradiating units 8 (S31). Then, the microcomputer 3 reads the voltage values of all the light receiving units 9A1 to 9A3, 9B1 to 9B3 and 9C1 (S32), and turns off the irradiating units 8 (S33). Next, the microcomputer 3 performs a color determination process and a boundary determination process based on the output of the light receiving units 9 (S34, S35). The details of the color determination process and the boundary determination process are described later.

Next, the microcomputer 3 determines whether an abnormality is detected in the color determination process, as in S5 (S36), When the abnormality is detected in the color determination process (YES in S36), this process ends. When the abnormality is not detected in the color determination process (NO in S36), the microcomputer 3 determines whether the light receiving units to be used for length measurement are the light receiving units 9A1 to 9A3, from a result of the boundary determination process (S37).

When the light receiving units 9A1 to 9A3 are used for length measurement (YES in S37), the microcomputer 3 calculates the ternary value or the decimal value from the color of each pattern detected by the light receiving units 9A1 to 9A3 (S38), When the light receiving units 9B1 to 9B3 are used for length measurement (NO in S37), the microcomputer 3 calculates the ternary value or the decimal value from the color of each pattern detected by the light receiving units 9B1 to 9B3 (S39). After S38 and S39, the microcomputer 3 sets the L corresponding to the scale value in the table of FIGS. 3 to 0 for comparison with the value calculated in S38 or S39 (L=0) (S40), Next, the microcomputer 3 determines whether the value calculated in S38 or S39 matches the L-th scale value with reference to the table of FIG. 3 (S41). When the value calculated in S38 or S39 matches the L-th scale value (YES in S41), the microcomputer 3 stores the scale value in the buffer 3A (S44), and this process ends. The scale value stored in the buffer 3A is transmitted to the external terminal 10 using the communication unit 4.

When the value calculated in S38 or S39 does not match the L-th scale value (NO in S41), the microcomputer 3 increments the L value by 1 (L=L+1) (S42). Then, the microcomputer 3 determines whether all the scale values (L=0 to 26) are checked (S43). When all the scale values are not checked (NO in S43), the process returns to S41. When all the scale value are checked (YES in S43), this process ends.

Figure 12:
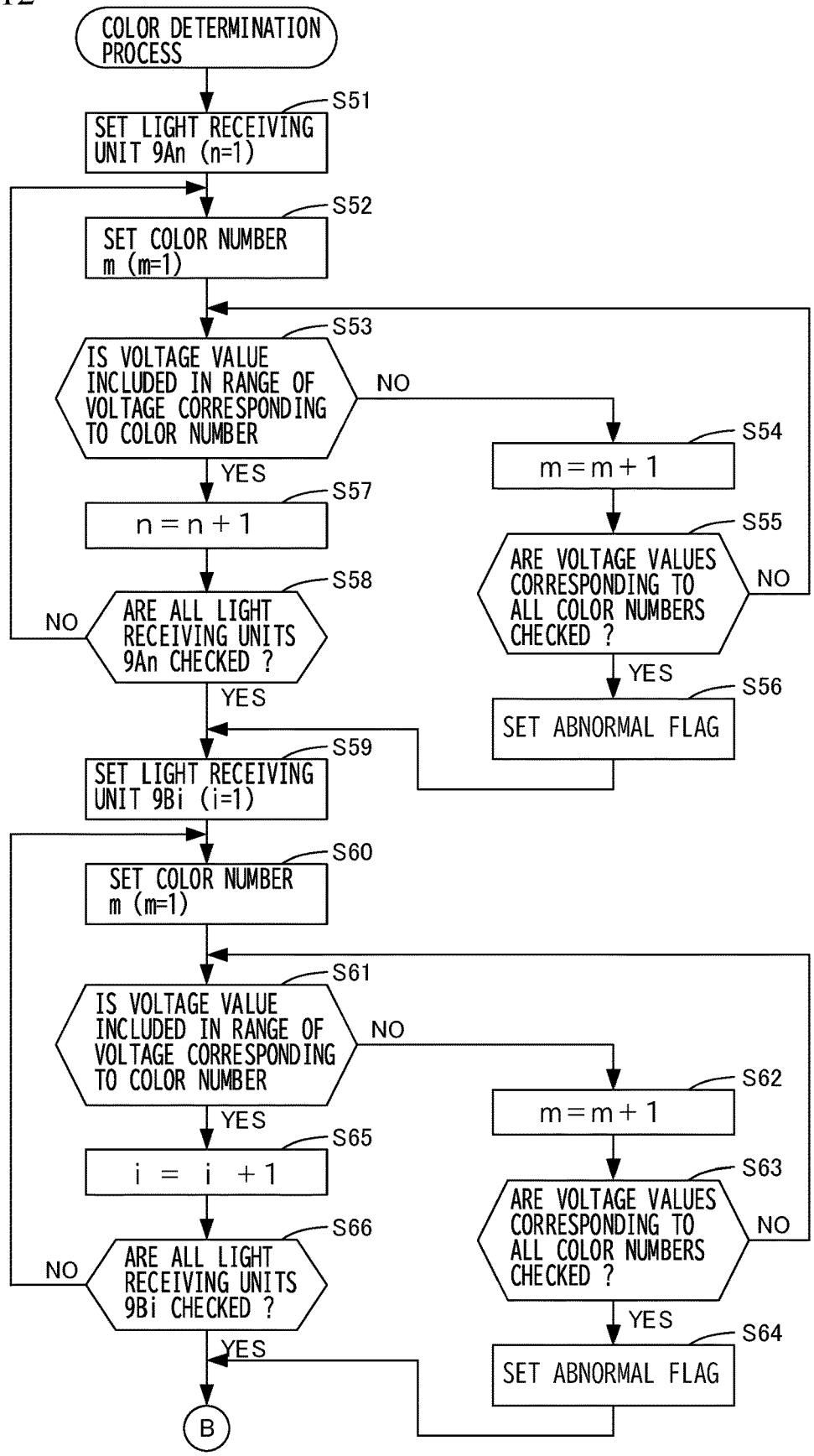
FIG. 12 is a flowchart illustrating a color determination process in S34.
Figure 13:
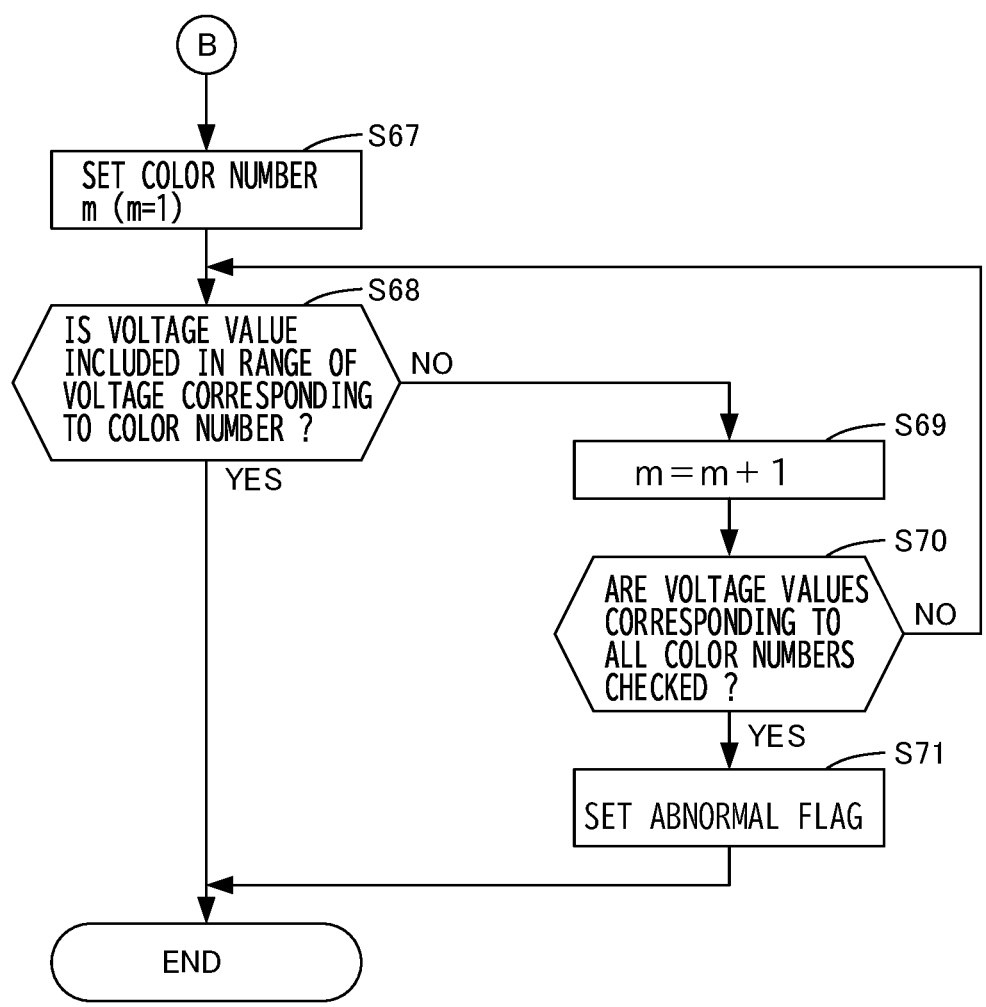
FIG. 13 is a flowchart illustrating the color determination process in S34.

FIGS. 12 and 13 are flowcharts illustrating the color determination process in S34.

The microcomputer 3 sets the light receiving unit 9An, which is the object of the color determination process, to 9A1 (n=1) (S51), and sets the color number m to 1 (m=1) (S52). Next, the microcomputer 3 determines whether the voltage value of the light receiving unit 9An is included in the range of the voltage value corresponding to the color number m (S53). When the voltage value of the light receiving unit 9An is not included in the range of the voltage value corresponding to the color number m (NO in S53), the microcomputer 3 increments the color number m by 1 (m=m+1) (S54). The microcomputer 3 determines whether the voltage values corresponding to all the color numbers are checked (S55).

When the voltage values corresponding to all the color numbers are not checked (NO in S55), the process returns to S53. When the voltage values corresponding to all the color numbers are checked (YES in S55), the microcomputer 3 sets an abnormal flag indicating the abnormality of the light receiving unit 9An to the buffer 3A (S56), and the process proceeds to S59.

When the voltage value of the light receiving unit 9An is included in the range of the voltage value corresponding to the color number m (YES in S53), the microcomputer 3 increments the value of the light receiving unit 9An by 1 (n=n+1) (S57). The microcomputer 3 determines whether all the light receiving units 9A.n are checked (S58). When all the light receiving units 9An are not checked (NO in S58), the process returns to S52. When all the light receiving units 9An are checked (YES in S58), the process proceeds to S59, and a process related to the light receiving units 9B is performed.

The microcomputer 3 sets a light receiving unit 9Bi, which is the object of the color determination process, to 9B1 (i=1) (S59), and sets the color number m to 1 (m=1) (S60). Next, the microcomputer 3 determines whether the voltage value of the light receiving unit 9Bi is included in the range of the voltage value corresponding to the color number m (S61). When the voltage value of the light receiving unit 9Bi is not included in the range of the voltage value corresponding to the color number m (NO in S61), the microcomputer 3 increments the color number m by 1 (m=m+1) (S62), The microcomputer 3 determines whether the voltage values corresponding to all the color numbers are checked (S63).

When the voltage values corresponding to all the color numbers are not checked (NO in S63), the process returns to S61. When the voltage values corresponding to all the color numbers are checked (YES in S63), the microcomputer 3 sets an abnormal flag indicating the abnormality of the light receiving unit 9Bi to the buffer 3A (S64), and the process proceeds to S67.

When the voltage value of the light receiving unit 9Bi is included in the range of the voltage value corresponding to the color number m (YES in S61), the microcomputer 3 increments the value of the light receiving unit 9Bi by 1 (i=i−1) (S65). The microcomputer 3 determines whether all the light receiving units 9Bi are checked (S66). When all the light receiving units 9Bi are not checked (NO in S66), the process returns to S60. When all the light receiving units 9Bi are checked (YES in S66), the process proceeds to S67, and a process related to the light receiving unit 9C1 is performed.

The microcomputer 3 sets the color number m to 1 (m=1) (S67). Next, the microcomputer 3 determines whether the voltage value of the light receiving unit 9C1 is included in the range of the voltage value corresponding to the color number m (S68), When the voltage value of the light receiving unit 9C1 is not included in the range of the voltage value corresponding to the color number m (NO in S68), the microcomputer 3 increments the color number m by 1 (m=m+1) (S69). The microcomputer 3 determines whether the voltage values corresponding to all the color numbers are checked (S70). When the voltage values corresponding to all the color numbers are not checked (NO in S70), the process returns to S68. When the voltage values corresponding to all the color numbers are checked (YES in S70), the microcomputer 3 sets an abnormal flag indicating the abnormality of the light receiving unit 9C1 to the buffer 3A (S71), and this process ends.

When the voltage value of the light receiving unit 9C1 is included in the range of the voltage value corresponding to the color number m (YES in S68), this process ends.

Figure 14:
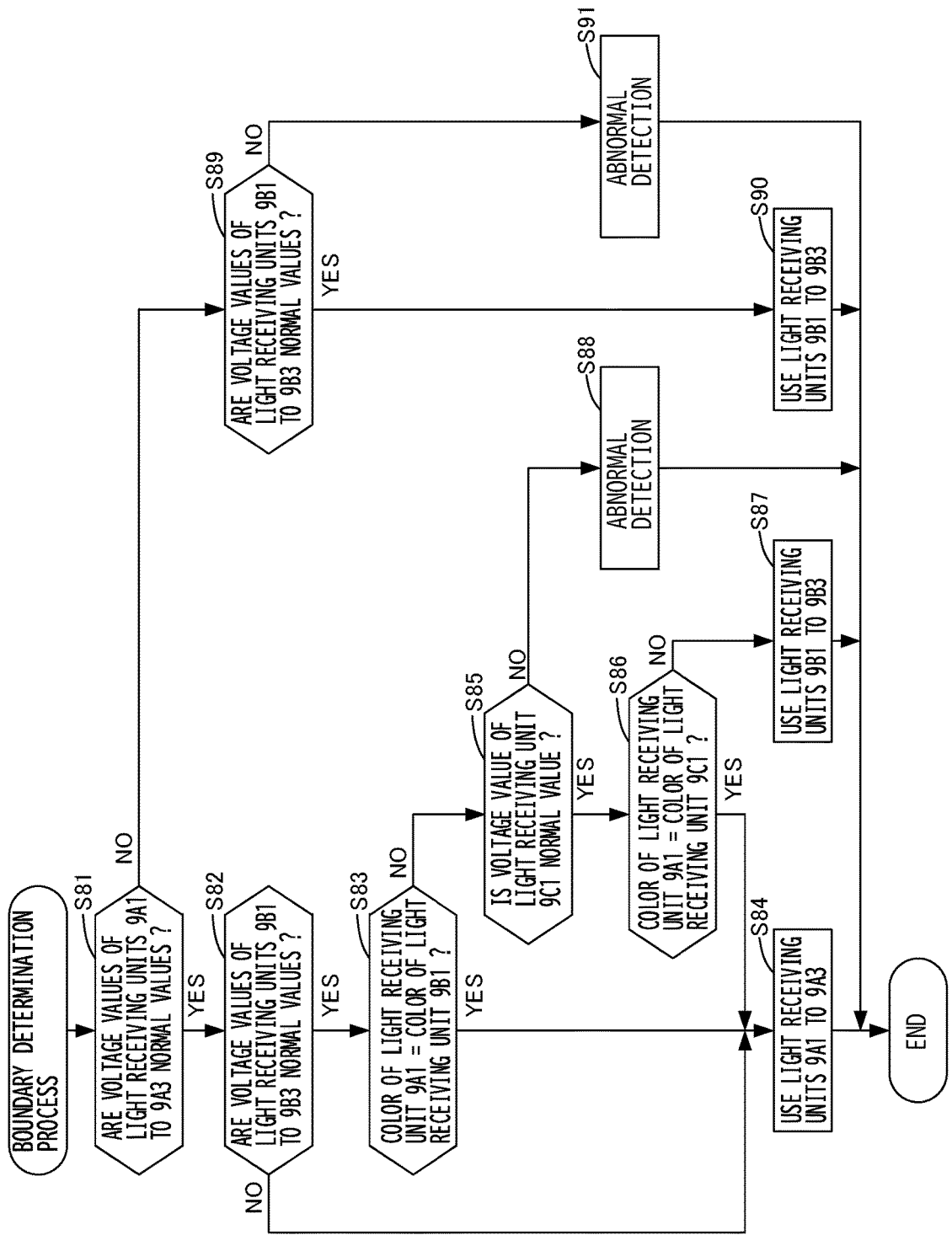
FIG. 14 is a flowchart illustrating a boundary determination process in S35.

FIG. 14 is a flowchart illustrating the boundary determination process in S35.

The microcomputer 3 determines whether the voltage values of the light receiving units 9A1 to 9A3 are normal values (S81). When the voltage value of the light receiving unit 9 is included in the range of the voltage value corresponding to any of the color numbers m, the microcomputer 3 determines that the voltage value of the light receiving unit 9 is the normal value. When the voltage values of the light receiving units 9A1 to 9A3 are normal values (YES in S81), the microcomputer 3 determines whether the voltage values of the light receiving units 9B1 to 9B3 are normal values (S82). When the voltage value of any of the light receiving units 9B1 to 9B3 is not normal values (NO in S82), the microcomputer 3 measures the length using the voltage values of the light receiving units 9M to 9A3 (S84), and this process ends.

When the voltage values of the light receiving units 9B1 to 9B3 are normal values (YES in S82), the microcomputer 3 determines whether the color detected by the light receiving unit 9A1 matches the color detected by the light receiving unit 9B1 (S83). When the color detected by the light receiving unit 9A1 matches the color detected by the light receiving unit 9B1 (YES in S83), the process proceeds to S84. When the color detected by the light receiving unit 9A1 does not match the color detected by the light receiving unit 9B1 (NO in S83), the microcomputer 3 determines whether the voltage value of the light receiving unit 9C1 is the normal value (S85).

When the voltage value of the light receiving unit 9C1 is not the normal value (NO) in S85), the microcomputer 3 determines that the detection result is abnormal (S88), and this process ends. When the voltage value of the light receiving unit 9C1 is the normal value (YES in S85), the microcomputer 3 determines whether the color detected by the light receiving unit 9A1 matches the color detected by the light receiving unit 9C1 (S86). When the color detected by the light receiving unit 9A1 matches the color detected by the light receiving unit 9C1 (YES in S86), the process proceeds to S84. When the color detected by the light receiving unit 9A1 does not match the color detected by the light receiving unit 9C1 (NO in S86), the microcomputer 3 measures the length using the voltage values of the light receiving units 9B1 to 9B3 (S87), and this process ends.

When any of the voltage values of the light receiving units 9A1 to 9A3 is not the normal value (NO in S81), the microcomputer 3 determines whether the voltage values of the light receiving units 9B1 to 9B3 are the normal values (S89). When any of the voltage values of the light receiving units 9B1 to 9B3 is not the normal value (NO in S89), the microcomputer 3 determines that the detection result is abnormal (S91), and this process ends. When the voltage values of the light receiving units 9B1 to 9B3 are the normal values (YES in S89), the microcomputer 3 measures the length using the voltage values of the light receiving units 9B1 to 9B3 (S90), and this process ends.

Figure 15A:
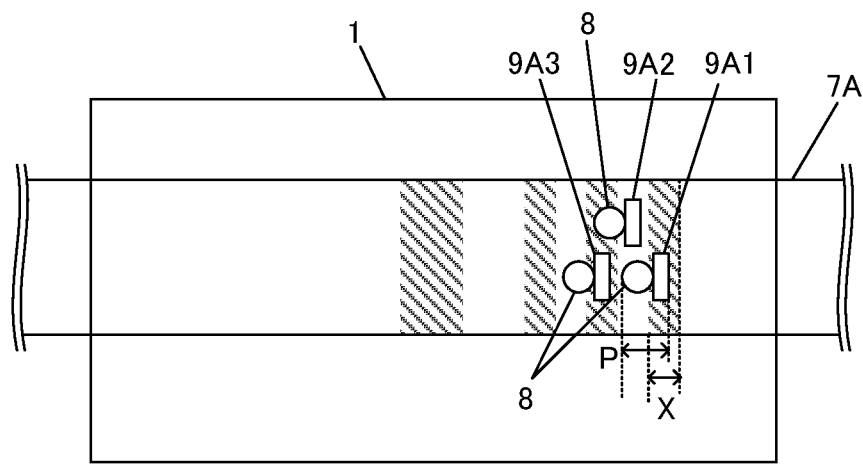
FIG. 15A is a diagram illustrating a first variation of the measuring instrument according to the first embodiment.
Figure 15B:
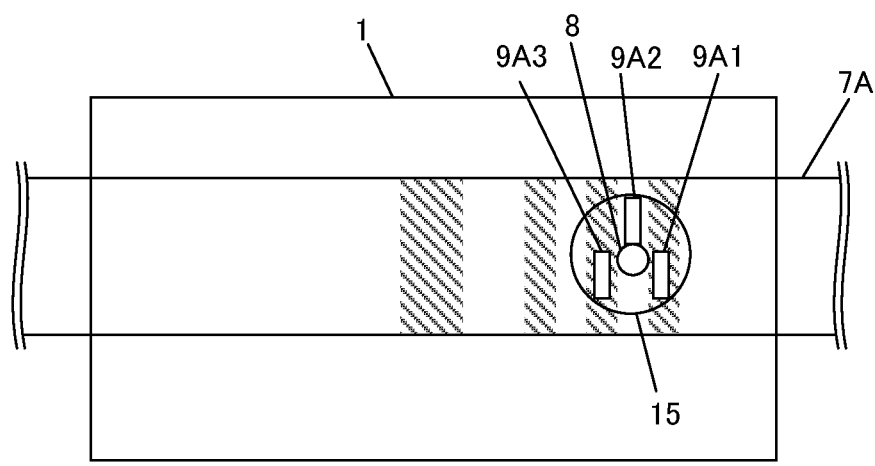
FIG. 15B is a diagram illustrating a second variation of the measuring instrument according to the first embodiment.

FIG. 15A is a diagram illustrating a first variation of the measuring instrument according to the first embodiment, and FIG. 15B is a diagram illustrating a second variation of the measuring instrument according to the first embodiment.

In the measuring instrument 1 according to the first embodiment, the length X of the pattern is longer than a length required for arranging the light receiving unit 9 and the irradiating unit 8 in the length direction, and hence the plurality of sets of light receiving units 9 are arranged in a row in the length direction of the measure 7A, as illustrated in FIG. 7.

However, when the length X of the pattern is shorter than a length P required for arranging one set of light receiving unit 9 in the length direction, as illustrated in FIG. 15A, the plurality of sets of light receiving units 9 cannot be arranged in a row in the length direction of the measure 7A. In this case, the plurality of sets of light receiving units 9 (9A1 to 9A3) may be arranged in a plurality of rows by shifting them in the width direction of the measure 7A, as illustrated in FIG. 15A. Even in such an arrangement, the length of the measurement object can be measured as in the first embodiment, and the measurement with higher resolution can be performed.

Further, the single irradiating unit 8 may be arranged within a range 15 where the plurality of light receiving units 9A1 to 9A3 can receive the reflected light, as illustrated in FIG. 15B. In this case, the light receiving units 9A1 to 9A3 are arranged in the plurality of rows in the width direction of the measure 7A. Even in such an arrangement, the length of the measurement object can be measured as in the first embodiment, and the number of irradiating units 8 can be reduced. Therefore, power consumption and manufacturing cost of the measuring instrument 1 can be reduced.

Figure 16A:
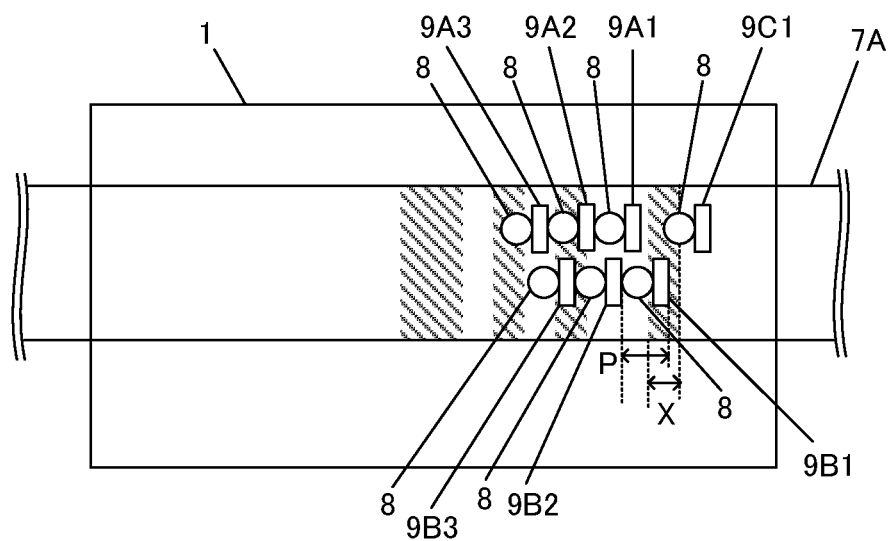
FIG. 16A is a diagram illustrating a first variation of the measuring instrument according to the second embodiment.
Figure 16B:
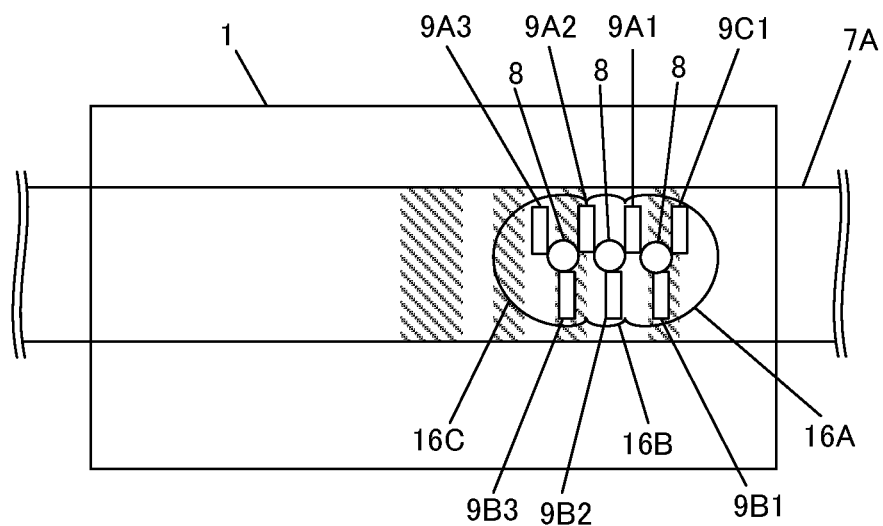
FIG. 16B is a diagram illustrating a second variation of the measuring instrument according to the second embodiment.

FIG. 16A is a diagram illustrating a first variation of the measuring instrument 1 according to the second embodiment, and FIG. 16B is a diagram illustrating a second variation of the measuring instrument 1 according to the second embodiment.

As illustrated in FIG. 16A, the plurality of sets of light receiving units 9 (9A1 to 9A3, 9B1 to 9B3, 9C1) may be arranged in the plurality of rows in the width direction of the measure 7A. Even in such an arrangement, the length of the measurement object can be measured as in the second embodiment, and the measurement with higher resolution can be performed.

Further, the single irradiating unit 8 may be arranged in a range 16A where the plurality of light receiving units 9A1, 9B1 and 9C1 can receive the reflected light, another single irradiating unit 8 may be arranged in a range 16B where the light receiving units 9A1, 9B2 and 9A2 can receive the reflected light, and the other single irradiating unit 8 may be arranged within a range 16C where the light receiving units 9A2, 9B3 and 9A3 can receive the reflected light, as illustrated in FIG. 16B. In this case, the light receiving units 9A1 to 9A3, 9B1 to 9B3, and 9C1 are arranged in the plurality of rows in the width direction of the measure 7A. Even in such an arrangement, the length of the measurement object can be measured, and the number of irradiating units 8 can be reduced. Therefore, the power consumption and the manufacturing cost of the measuring instrument 1 can be reduced.

As described above, according to the second embodiment, the microcomputer 3 determines whether the light receiving units 9A1 to 9A3 read the boundaries based on the colors read by the light receiving unit 9A1, the light receiving unit 9B1 that is away from the light receiving unit 9A1 in the length direction by the interval Y shorter than the interval X, and the light receiving unit 9C1 that is away from the light receiving unit 9A1 in the length direction by the interval Z shorter than the interval X and is opposite to the light receiving unit 9B1 with respect to the light receiving unit 9A1. Therefore, even if the output value of the light receiving unit 9A1 when reading any pattern is the same as the output value of the light receiving unit 9A1 when reading the boundary between the two patterns, the microcomputer 3 can determine whether the light receiving unit 9A1 reads the boundary between the two patterns, and can accurately measure the length of the measurement object.

When the light receiving units 9A1 to 9A3 detect the boundaries between the two patterns, the light receiving units 9B1 to 9B3 are used instead of the light receiving units 9A1 to 9A3, so that the length of the measurement object can be measured accurately.

In the above embodiment, the single unit pattern is composed of three adjacent patterns, but the number of patterns constituting the single unit pattern may be two or four or more. Further, the plurality of patterns constituting the single unit pattern need not to be adjacent to each other.

In the above embodiment, the pattern is expressed by the ternary number, but an N-ary number in which N exceeds 3 may be used.

In the above embodiment, the number of patterns constituting the unit pattern are the same as the number of light receiving units 9A or light receiving units 9B, but the number of light receiving units 9A and the number of light receiving units 9B may exceed the number of patterns constituting the unit pattern. In this case, it is possible to perform measurement using a plurality of types of measures having different numbers of patterns constituting the unit pattern with a single measuring instrument. Switching between functions can be done by operating a switch or switching/rewriting software.

Third Embodiment

Next, a description is given of a third embodiment.

In the above-mentioned measure 7A, a problem in which the width of the measure 7A increases and a problem in which the number of light receiving units 9 arranged in the width direction increases are solved by arranging the plurality of patterns in a row in the length direction.

However, when it is desired to increase the length that can be measured by the measure 7A, it is necessary to increase the number of patterns read by the light receiving unit 9, and hence the number of light receiving units 9 arranged in a row in the length direction must be increased. For this reason, when the light receiving units 9 are arranged in a row in the length direction, the measuring instrument 1 may be enlarged in the length direction, which may deteriorate the usability. Therefore, it is desired to reduce the size of the light receiving unit 9 or the measuring instrument 1 in the length direction.

Therefore, in the third embodiment, the light receiving units 9 are arranged in two or more rows in the width direction and individual color pattern is arranged to each row, so that the size of the measuring instrument 1 in the length direction is reduced.

The method of reading the pattern of the measure 7A and the process flow in the third embodiment are the same as those in the first or second embodiment described above, Therefore, software or firmware executed by the microcomputer 3 does not need to be changed from software or firmware in the first or second embodiment, and the arrangement of the pattern of the measure 7A and the arrangement of the light receiving unit 9 are changed. Here, the structure of the light receiving unit 9 is not changed, and the arrangement of the light receiving units 9 are changed.

FIGS. 17A to 17D are diagrams illustrating a method for converting a plurality of patterns arranged in a row in the length direction into the plurality of patterns arranged in four rows in the width direction in order to read the color pattern using four light receiving units 9 arranged in a row in the width direction. Hereinafter, the color pattern in a row in the length direction may be described as a single-line color pattern or any one of the color patterns in the first to fourth lines.

Figure 17A:
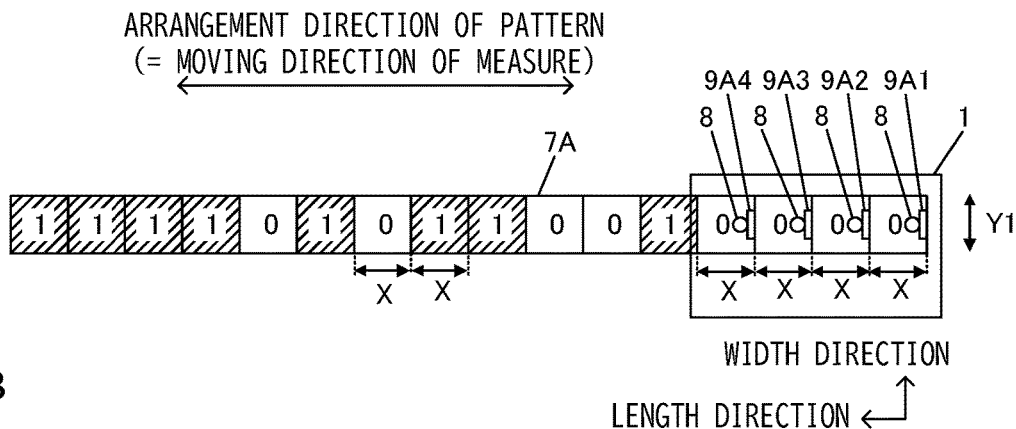
FIGS. 17A to 17D are diagrams illustrating a method for converting a plurality of patterns arranged in a row in the length direction into the plurality of patterns arranged in four rows in the width direction in order to read the color pattern using four light receiving units arranged in a row in the width direction.

The color pattern having a plurality of patterns arranged in a row at regular intervals X in the length direction is printed on the measure 7A of FIG. 17A. Each pattern has one of three different colors, and any of 0, 1 or 2 is assigned to the color of each pattern. Although 17A does not illustrate an example of a pattern to which "2" is assigned, each pattern has any one of white, blue, and black, and values of "0", "1", and "2" are assigned to these colors, respectively, as in FIG. 2. The values of "0" to "2" in the pattern of FIG. 17A are for easy understanding, and it is not necessary to print these values on the measure 7A. Similarly, the boundaries between the patterns are also illustrated for ease of understanding, but it is not necessary to draw such boundaries on the measure 7A.

In the example of FIG. 17A, four patterns adjacent to each other in the length direction constitute the single unit pattern, and the single ternary value is assigned to the single unit pattern.

The interval X, which is also the length of the pattern, corresponds to the unit length measurable by the measure 7A. In the measuring instrument 1, four light receiving units 9A1 to 9A4 and four irradiating units 8 for detecting the reflected light from the color patterns of the measure 7A are arranged at the intervals X in the same manner as the patterns. Each light receiving unit 9A reads the single pattern. In FIG. 17A, a length Y1 in the width direction of the pattern is the same as the length of the interval X, but may be larger or smaller than the length of the interval X. The number of sets of the irradiating unit 8 and the light receiving unit 9 may be two or four or more depending on the number of patterns constituting the single unit pattern and the like. As described above, the number of irradiating units 8 does not have to be the same as the number of patterns constituting the single unit pattern.

In a state of FIG. 17A, the light receiving units 9A1, 9A2, 9A3 and 9A4 read a rightmost pattern in the single unit pattern, a second pattern from the right in the single unit pattern, a third pattern from the right in the single unit pattern, and a fourth pattern from the right in the single unit pattern, respectively.

When the measure 7A is moved to the right by the interval X or the measuring instrument 1 is moved to the left by the interval X from the state of FIG. 17A the light receiving unit 9A1 reads the pattern read by the light receiving unit 9A2 in the state of FIG. 17A. When the measure 7A is moved to the right by an interval 2X (i,e., twice the interval X) or the measuring instrument 1 is moved to the left by the interval 2X from the state of FIG. 17A, the light receiving unit 9A1 reads the pattern read by the light receiving unit 9A3 in the state of FIG. 17A. When the measure 7A is moved to the right by an interval 3X (i,e., three times the interval X) or the measuring instrument 1 is moved to the left by the interval 3X from the state of FIG. 17A, the light receiving unit 9A1 reads the pattern read by the light receiving unit 9A4 in the state of FIG. 17A.

Therefore, when the light receiving units 9A1 to 9A4 are arranged in a row in the width direction of the measure 7A, the color patterns in the second to fourth lines to be read by the light receiving units 9A2 to 9A4 may be shifted from the color pattern in the first line to be read by the light receiving unit 9A1 by an integer multiple (1, 2, 3 . . . ) of the interval X in the longitudinal direction (in the left direction of FIG. 17A), and arranged in the width direction of the color pattern in the first line.

Figure 17B:
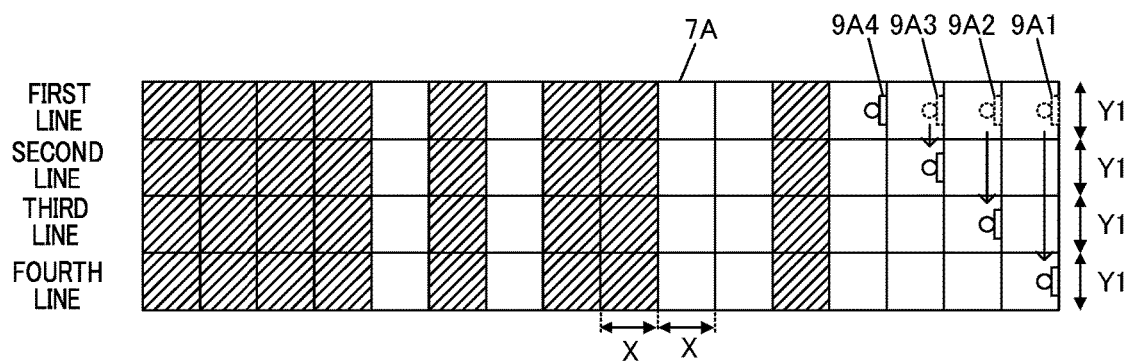
Figure 17C:
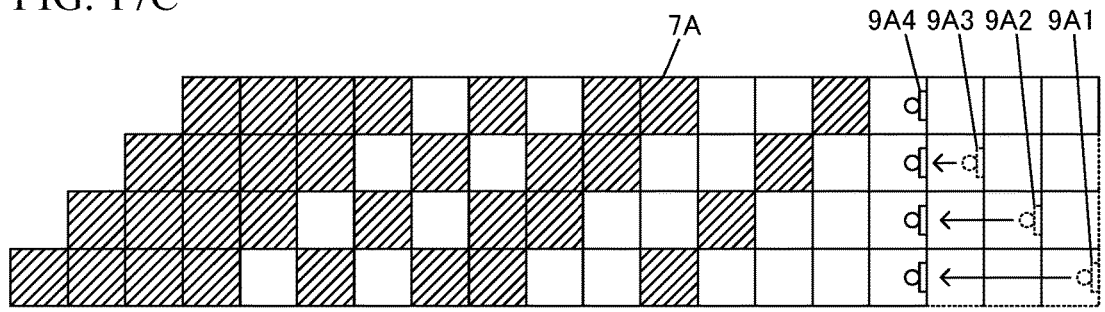
Figure 17D:
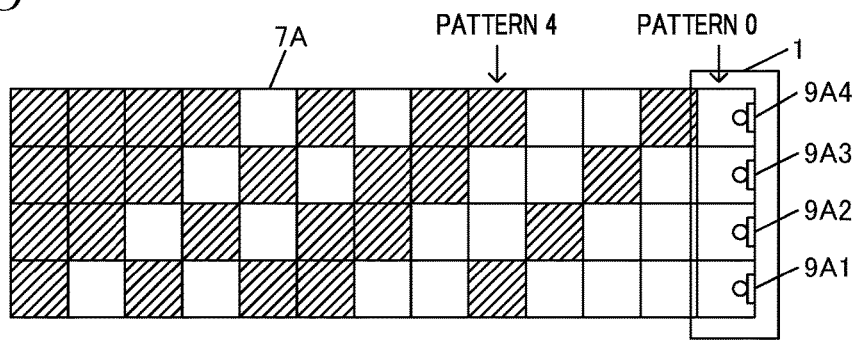

FIG. 17D illustrates an example of four-line color patterns (i.e., the color patterns arranged in four rows in the width direction) on the measure 7A. The color patterns in second, third, and fourth lines are arranged by shifting the same color pattern as the color pattern in the first line by the intervals X, 2X, and 3X in the left direction of FIG. 17A, respectively. Thereby, the value read by the light receiving units 9A1 to 9A4 arranged in a row in the width direction of FIG. 17D are the same as the values read by the light receiving units 9A1 to 9A4 arranged in a row in the length direction of FIG. 17A.

Figure 18:
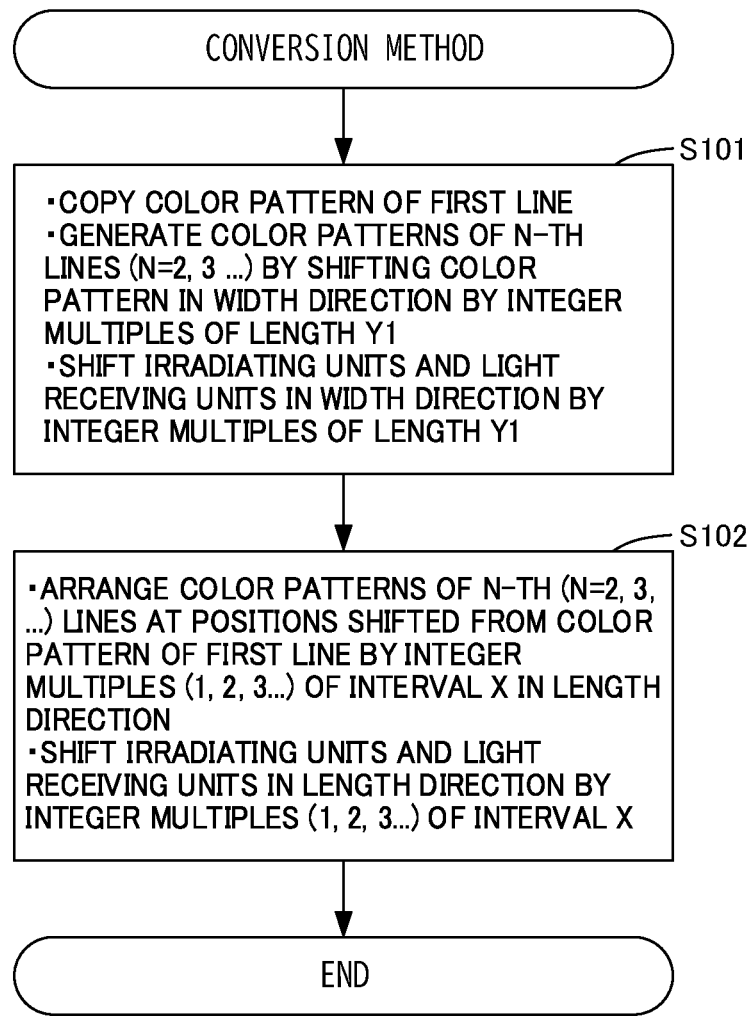
FIG. 18 is a flowchart illustrating a method for arranging color patterns arranged in four rows in the width direction of FIG. 17D using the color pattern arranged in a row in the length direction of FIG. 17A.

FIG. 18 is a flowchart illustrating a method for arranging four-line color patterns of FIG. 17D using a single-line color pattern of FIG. 17A.

First, the color patterns in the second to fourth lines are generated by copying the color pattern in the first line including a plurality of patterns arranged at regular intervals in the length direction of FIG. 17A, and shifting and pasting the color pattern of the first line in the width direction by integer multiples of the length Y1 of the pattern in the width direction (S101). FIG. 17B also illustrates a state in which the sets of the irradiation units 8 and the light receiving units 9A1 to 9A3 are virtually shifted in the width direction in order to illustrate a relationship between the pattern of each line and each light receiving unit 9. In FIG. 17B, the light receiving unit 9A4 that reads a fourth pattern from the right is arranged on the color pattern in the first line. The light receiving unit 9A3 that reads a third pattern from the right is arranged on the color pattern in the second line. The light receiving unit 9A2 that reads a second pattern from the right is arranged on the color pattern in the third line. The light receiving unit 9A1 that reads a rightmost pattern is arranged on the color pattern in the fourth line.

Next, as illustrated in FIG. 17C, the color patterns in the second to fourth lines are arranged at positions shifted from the color pattern in the first line by 1 times, 2 times, and 3 times the interval X in the length direction (i.e., a left direction of FIG. 17C), respectively (S102). On the other hand, each of the light receiving units 9A1 to 9A3 illustrated in FIG. 17C is shifted in the length direction by an amount in which the color pattern in each line is shifted with respect to the arrangement of the color pattern in each line illustrated in FIG. 17B. Thereby, the light receiving units 9A1 to 9A4 are arranged in a row in the width direction.

As described above, the four-line color patterns as illustrated in FIG. 17D can be obtained from the state of FIG. 17A. The patterns of "pattern No. 0" illustrated in FIG. 17D corresponds to the unit pattern from the rightmost pattern to the fourth pattern from the right in FIG. 17A, and the patterns of "pattern No. 4" corresponds to the unit pattern from the fifth pattern to the eighth pattern from the right in FIG. 17A.

The measure 7A of FIG. 171 generated by the conversion method of FIG. 18 includes (1) the color pattern in the first line including the plurality of patterns arranged at intervals X in the length direction, and (2) one or more color pattern in N-th line (N=2 or more integers) arranged at positions that are shifted in the width direction from the color pattern in the first line and shifted in the length direction from the color pattern in the first line by integer multiples (1, 2, 3 . . . ) of the interval X. The color patterns in the second to fourth lines of FIG. 17D are shifted in the width direction from the color pattern in the first line by integral multiples (1, 2, 3 . . . ) of the length Y1.

Even when the four-line color patterns and the light receiving units 9A1 to 9A4 arranged in a row in the width direction are used as illustrated in FIG. 17D, the same measurement process as that in FIG. 5 is executed. That is, the microcomputer 3 converts the patterns read by the light receiving units 9A1 to 9A4 into the Nary value (N is 3 or more), and calculates the scale value of the measure 7A based on data that defines the relationship between the N-ary value and the scale value of the measure 7A.

FIG. 19 is a diagram illustrating a correspondence relationship between the measure of FIG. 17A, values read by the light receiving units 9A1 to 9A4, a pattern No., and converted values of the ternary number and the decimal number. Here, the "pattern No." is an identification number of the unit pattern and corresponds to the scale value of the measure 7A.

For example, when the light receiving units 9A1 to 9A4 read the pattern No4, the light receiving units 9A1 and 9A4 detect the value of "1", and the light receiving units 9A2 and 9A3 detect the value of "0". It can be seen that the values of the pattern No. 4 read by the light receiving units 9A4 to 9A1 of FIG. 19 correspond to the color patterns in the first to fourth lines corresponding to the pattern No. 4 of FIG. 17D, respectively.

Therefore, it can be seen from FIG. 19 that the values read by the light receiving units 9A1 to 9A4 arranged in a row in the length direction of FIG. 17A are the same as the values read by the light receiving units 9A1 to 9A4 arranged in a row in the width direction of FIG. 17D.

FIGS. 20A to 20D are diagrams illustrating a method for converting the color pattern including the plurality of patterns arranged in a row in the length direction into two color patterns arranged in two rows in the width direction.

Figure 20A:
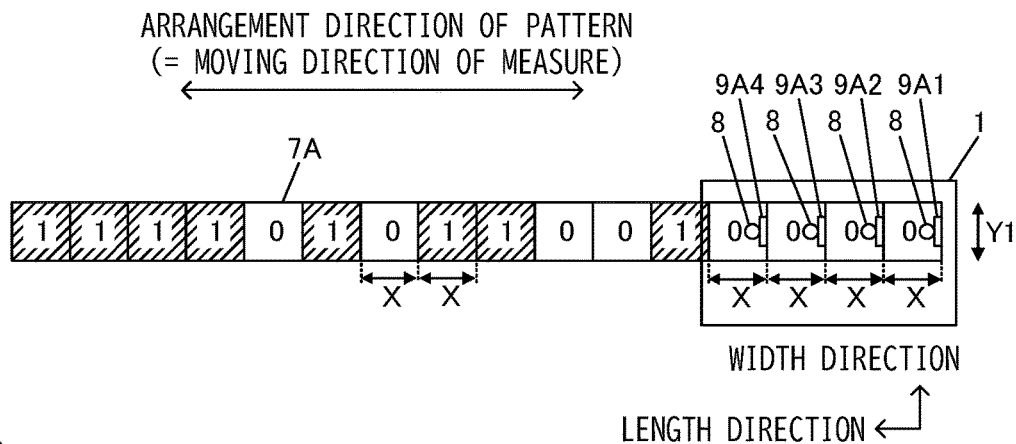
FIGS. 20A to 20D are diagrams illustrating a method for converting the plurality of patterns and the four light receiving units arranged in a row in the length direction into the plurality of patterns arranged in two rows in the width direction and the four light receiving units arranged in two rows in the width direction.
Figure 20B:
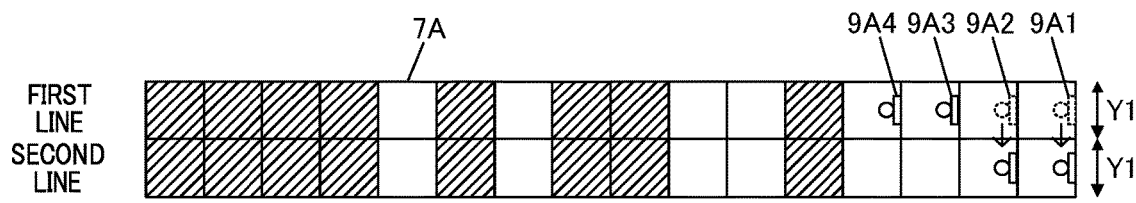
Figure 20C:
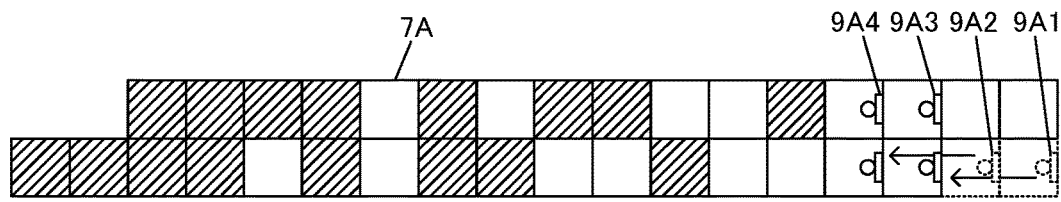
Figure 20D:
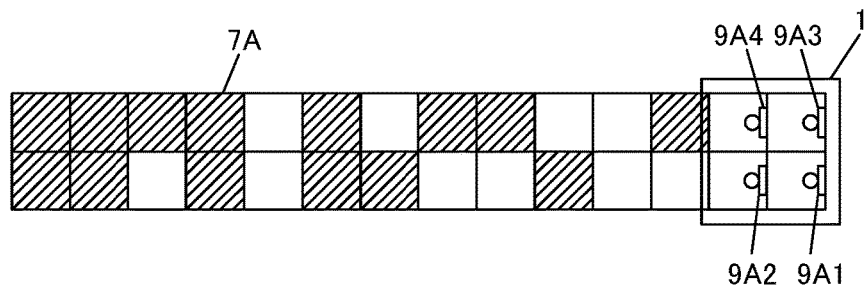

The same method as in FIG. 18 is adopted to convert the light receiving units 9A1-9A4 arranged in a row in the length direction and the single-line color pattern in FIG. 20A into the light receiving units 9A1-9A4 arranged in two rows in the width direction and the two-line color patterns in FIG. 20D.

Specifically, the color pattern in the second line is generated by copying the color pattern of FIG. 20A, and pasting the color pattern of the first line at a position shifted in the width direction by an integer multiple (one time) of the length Y1 of the pattern in the width direction from the color pattern of the first line (S101 in FIG. 19). FIG. 20B illustrates a state in which the light receiving units 9A1 and 9A2 are virtually shifted in the width direction. As illustrated in FIG. 2011, the light receiving units 9A3 and 9A4 are arranged on the color pattern in the first line without moving in the length direction, and the light receiving units 9A1 and 9A2 are moved in the width direction and arranged on the color pattern in the second line.

Next, as illustrated in FIG. 20C, the color pattern in the second line is arranged at the position shifted in the length direction (left direction of FIG. 20C) from the color pattern in the first line by an integer multiple of the interval X (S102 in FIG. 18). In the example of FIG. 20, the color pattern in the second line is arranged at a position shifted by the interval 2X from the color pattern in the first line. Each of the light receiving units 9A1 to 9A2 is arranged at the position shifted by the interval 2X in the length direction (i.e., the left direction of FIG. 20C) with respect to its position of FIG. 20B in accordance with the shift of the color pattern in the second line.

Thereby, the two-line color patterns as illustrated in FIG. 20D can be obtained from the state of FIG. 20A. In FIG. 20D, the color patterns are read by using the light receiving units 9A1 to 9A4 arranged in 2 lines 2 rows, thereby measuring the length.

Figure 21A:
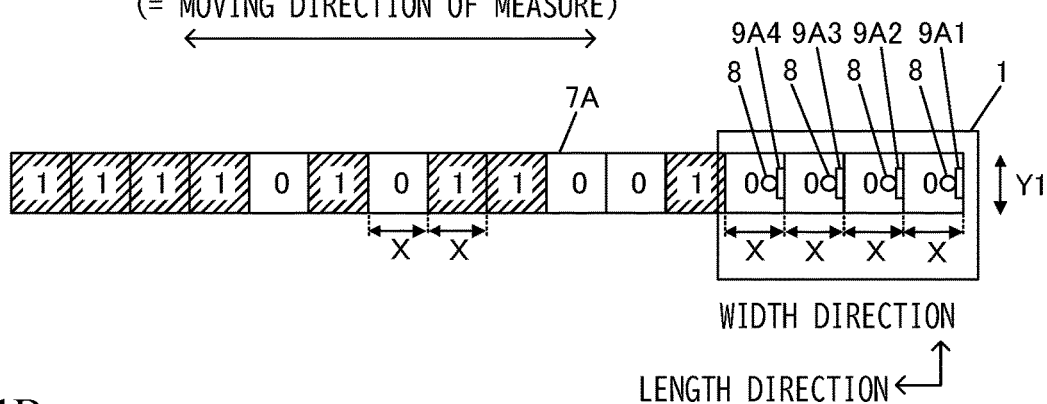
FIGS. 21A to 21D are diagrams illustrating a variation of the method for converting the plurality of patterns and the four light receiving units arranged in a row in the length direction into the plurality of patterns arranged in two rows in the width direction and the four light receiving units arranged in two rows in the width direction.
Figure 21B:
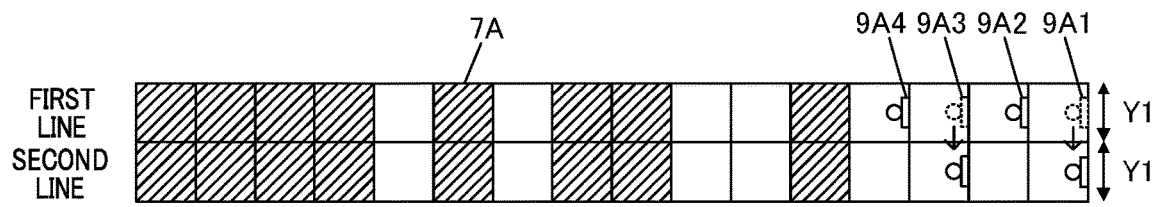

FIGS. 21A to 2M are diagrams illustrating a variation of the method for converting the color pattern including the plurality of patterns arranged in a row in the length direction into two color patterns arranged in two rows in the width direction.

Figure 21C:
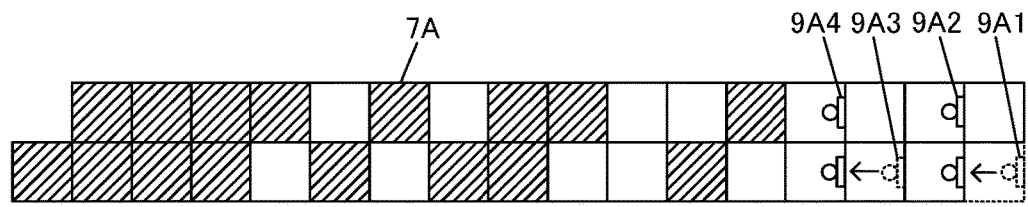
Figure 21D:
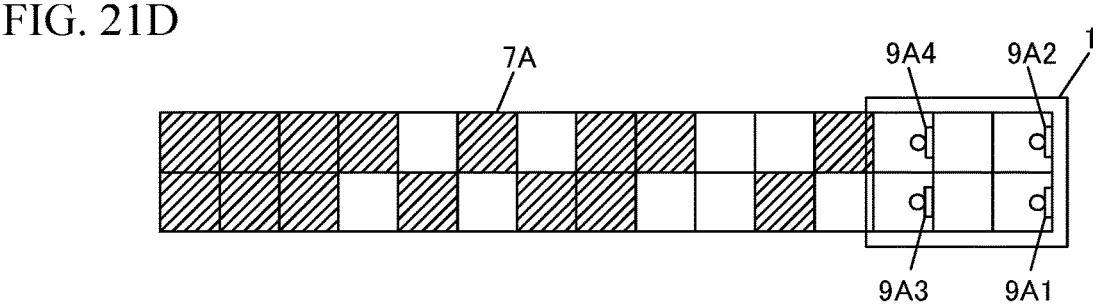

The same method as in FIG. 18 is adopted to convert the light receiving units 9A1 to 9A4 arranged in a row in the length direction and the single-line color pattern in FIG. 21A into the light receiving units 9A1 to 9A4 arranged in two rows in the width direction and the two-line color patterns in FIG. 21D.

In FIGS. 21A to 21D, a type of the set of the light receiving units 9 to be shifted and a shift amount of the color pattern in the second line are changed, as compared with FIGS. 20A to 20D.

In FIG. 21C, the color pattern in the second line is shifted in the left direction of FIG. 21C by the interval 2X with respect to the color pattern in the first line. At this time, the even-numbered light receiving units 9A2 and 9A4 read the color pattern in the first line, and the odd-numbered light receiving units 9A1 and 9A3 read the color pattern in the second line. The light receiving units 9A2 and 9A1 are arranged in the width direction, and the light receiving units 9A4 and 9A3 are also arranged in the width direction. Further, the light receiving units 9A1 and 9A3 are separated from each other by the distance 2X in the length direction, and the light receiving unit 9A2 and the light receiving unit 9A4 are also separated from each other by the distance 2X in the length direction. Other processing of FIGS. 21A to 21D is the same as that of FIGS. 20A to 20D.

Three-line color patterns are formed by shifting the single-line color pattern in the same manner as FIG. 18, and the three-line color patterns may be read by arranging the light receiving units 9A1 to 9A4 arranged in a row in the length direction, in two rows.

In the third embodiment, only the light receiving units 9A1 to 9A4 are used, but the measuring instrument 1 of the third embodiment may include the light receiving units 9B1 to 9B4 and the light receiving unit 9C1 in addition to the light receiving units 9A1 to 9A4, in the same manner as the second embodiment and FIG. 9. In this case, the measuring instrument 1 of the third embodiment can also execute the measurement process of FIG. 11, the color determination process of FIGS. 12 and 13, and the boundary determination process of FIG. 14.

As described above, according to the third embodiment, the arrangement of the light receiving units 9A1 to 9A4 and the number of lines of the color pattern can be changed without changing the values read by the light receiving units 9A1 to 9A4 arranged in a row in the length direction, and hence the widths of the measure 7A and the light receiving units 9 or the width of the measuring instrument 1 can be changed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A measuring instrument comprising:
   a plurality of first readers that optically read a plurality of patterns from a measure having a color pattern including the plurality of patterns arranged at a regular interval in a length direction, the plurality of first readers being arranged at the regular interval in the length direction;
   a converter that converts the plurality of patterns read by the plurality of first readers into a value of an N-ary number (N is 3 or more); and
   a calculator that calculates a scale value of the measure based on data that defines a relationship between the value of the N-ary number and the scale value of the measure.

2. The measuring instrument as claimed in claim 1, further comprising:
   a second reader that is arranged at a position away from at least one of the plurality of first readers in the length direction by a distance shorter than the regular interval;
   a third reader that is arranged at a position away from any one of the plurality of first readers in a direction opposite to the length direction with respect to the second reader, by a distance shorter than the regular interval; and
   a determiner that determines whether each of the first readers reads a boundary between two adjacent patterns based on reading results of the second reader, the third reader and any one of the plurality of first readers.

3. The measuring instrument as claimed in claim 2, wherein
   the second reader includes a plurality of second readers arranged at positions away from the plurality of first readers, respectively, by a distance shorter than the regular interval in the length direction,
   when the determiner determines that each of the first readers reads the boundary between the plurality of patterns, the converter measures a length by using the reading results of the plurality of second readers instead of the reading results of the first readers.

4. The measuring instrument as claimed in claim 1, wherein
   the first readers are arranged in a plurality of rows in the length direction.

5. The treasuring instrument as claimed in claim 2, wherein
   the first readers and the second readers are arranged in a plurality of rows in the length direction.

6. A measure comprising:
   a color pattern to be read by the measuring instrument as claimed in claim 1.

7. A measuring instrument comprising:
   a first reader that optically reads a first color pattern from a measure, the measure having the first color pattern arranged at a regular interval in a length direction, and a second color pattern that is shifted from the first color pattern by an integral multiple of the regular interval in the length direction and arranged in a width direction of the first color pattern;
   a second reader that is arranged at a position shifted in the width direction from the first reader, and optically reads the second color pattern; and
   a calculator that calculates a scale value of the measure based on a plurality of patterns read by the first reader and the second reader.

8. The measuring instrument as claimed in claim 7, wherein
   the plurality of patterns read by the first reader and the second reader are the same as patterns read by a plurality of reading units, the plurality of reading units optically reading a plurality of patterns included in the first color pattern and being arranged at the regular interval in the length direction.

9. A measure comprising:
   a first color pattern arranged at a regular interval in a length direction; and
   a second color pattern that is shifted in a width direction from the first color pattern, and is shifted in the length direction from the first color pattern by an integral multiple of the regular interval in the length direction.

\* \* \* \* \*